(12) United States Patent
Munk

(10) Patent No.: US 11,989,707 B1
(45) Date of Patent: *May 21, 2024

(54) ASSIGNING RAW DATA SIZE OF SOURCE DATA TO STORAGE CONSUMPTION OF AN ACCOUNT

(71) Applicant: SPLUNK Inc., San Francisco, CA (US)

(72) Inventor: Alexander D. Munk, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 94 days.

This patent is subject to a terminal disclaimer.

(21) Appl. No.: 17/329,384

(22) Filed: May 25, 2021

Related U.S. Application Data

(63) Continuation of application No. 16/738,175, filed on Jan. 9, 2020, now Pat. No. 11,074,560, which is a continuation of application No. 14/610,777, filed on Jan. 30, 2015, now Pat. No. 10,572,863.

(51) Int. Cl.
  *G06Q 20/10* (2012.01)
  *G06F 16/31* (2019.01)
  *G06Q 20/08* (2012.01)

(52) U.S. Cl.
  CPC ......... *G06Q 20/102* (2013.01); *G06F 16/316* (2019.01); *G06Q 20/08* (2013.01)

(58) Field of Classification Search
  CPC ........ G06F 3/067; G06F 3/0608; G06F 16/27; G06Q 20/08; G06Q 20/102; G06Q 20/10
  See application file for complete search history.

(56) References Cited

U.S. PATENT DOCUMENTS

| | | |
|---|---|---|
| 5,913,214 A | 6/1999 | Madnick et al. |
| 7,702,614 B1 | 4/2010 | Shah et al. |
| 7,937,344 B2 | 5/2011 | Baum et al. |
| 7,966,293 B1 | 6/2011 | Owara et al. |
| 8,112,425 B2 | 2/2012 | Baum et al. |
| 8,571,882 B1 | 10/2013 | Teitelbaum |
| 8,751,529 B2 | 6/2014 | Zhang et al. |
| 8,788,525 B2 | 7/2014 | Neels et al. |
| 8,874,755 B1 | 10/2014 | Deklich et al. |

(Continued)

FOREIGN PATENT DOCUMENTS

JP  2006239937 A  * 9/2006

OTHER PUBLICATIONS

Kaseya, Understanding what controls the overall capacity of the appliance, https://helpdesk.kaseya.com/hc/en-GB/articles/4407524237713-Understanding-what-controls-the-overall-capacity-of-the-appliance, Jun. 10, 2010.*

(Continued)

*Primary Examiner* — Hao Fu
(74) *Attorney, Agent, or Firm* — Shook, Hardy & Bacon L.L.P.

(57) ABSTRACT

Provided are systems and methods for managing storage of machine data. In one embodiment, a method can be provided. The method can include receiving, from one or more data sources, raw machine data; processing the raw machine data to generate processed machine data; storing the processed machine data in a data store; and determining an allocated data size associated with the processed machine data stored in the data store, wherein the allocated data size is the size of the raw machine data corresponding to the processed machine data stored in the data store.

20 Claims, 20 Drawing Sheets

(56) References Cited

U.S. PATENT DOCUMENTS

| | | | |
|---|---|---|---|
| 8,898,542 B2* | 11/2014 | Leggette | H04L 67/10 714/766 |
| 9,215,240 B2 | 12/2015 | Merza et al. | |
| 9,229,657 B1 | 1/2016 | Rus et al. | |
| 9,286,413 B1 | 3/2016 | Coates et al. | |
| 9,501,506 B1 | 11/2016 | Fontoura et al. | |
| 10,127,258 B2 | 11/2018 | Lamas et al. | |
| 2002/0078134 A1 | 6/2002 | Stone et al. | |
| 2003/0093408 A1 | 5/2003 | Brown et al. | |
| 2003/0208417 A1 | 11/2003 | Heinrichs et al. | |
| 2004/0203609 A1 | 10/2004 | Sameer et al. | |
| 2005/0289110 A1 | 12/2005 | Giampaolo et al. | |
| 2006/0069635 A1 | 3/2006 | Ram et al. | |
| 2007/0124350 A1 | 5/2007 | Sjoblom et al. | |
| 2007/0168400 A1 | 7/2007 | Lee et al. | |
| 2007/0220420 A1 | 9/2007 | Sanders | |
| 2008/0307175 A1 | 12/2008 | Hart et al. | |
| 2009/0198669 A1 | 8/2009 | Shaw et al. | |
| 2009/0265305 A1 | 10/2009 | Barsness et al. | |
| 2010/0070427 A1 | 3/2010 | Rakhamimov et al. | |
| 2011/0219008 A1 | 9/2011 | Been et al. | |
| 2011/0219186 A1 | 9/2011 | Amit et al. | |
| 2012/0059823 A1 | 3/2012 | Barber et al. | |
| 2012/0066285 A1 | 3/2012 | McGowan et al. | |
| 2012/0143873 A1 | 6/2012 | Saadat | |
| 2012/0179684 A1 | 7/2012 | Alba et al. | |
| 2012/0233147 A1 | 9/2012 | Solheim et al. | |
| 2012/0254089 A1 | 10/2012 | Alba et al. | |
| 2013/0007371 A1 | 1/2013 | Hilerio et al. | |
| 2013/0013564 A1 | 1/2013 | Ben-Or et al. | |
| 2013/0041871 A1 | 2/2013 | Das et al. | |
| 2013/0054537 A1* | 2/2013 | Das | G06F 16/134 707/673 |
| 2013/0159281 A1 | 6/2013 | Yang et al. | |
| 2013/0204890 A1 | 8/2013 | Kamekawa | |
| 2013/0290665 A1 | 10/2013 | Heidel et al. | |
| 2014/0324862 A1 | 10/2014 | Bingham et al. | |
| 2015/0023170 A1 | 1/2015 | Kakadia et al. | |
| 2015/0074049 A1 | 3/2015 | Friedman et al. | |
| 2015/0254303 A1 | 9/2015 | Saadat et al. | |
| 2016/0092558 A1 | 3/2016 | Ago et al. | |
| 2019/0098106 A1 | 3/2019 | Mungel et al. | |

OTHER PUBLICATIONS

U.S. Appl. No. 14/610,704, filed Jan. 30, 2015, Which is: Granted.
U.S. Appl. No. 15/885,517, filed Jan. 31, 2018, Which is: Granted.
U.S. Appl. No. 14/610,777, filed Jan. 30, 2015, Which is: Granted.
U.S. Appl. No. 16/738,175, filed Jan. 9, 2020, Which is: Granted.
Bitincka, Ledion, et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, pp. 9.
Carasso, David, "Exploring Splunk," published by CITO Research, New York, NY, Apr. 2012, pp. 156.
Splunk Cloud 8.0.2004 User Manual, available online, retrieved May 20, 2020 from docs.splunk.com, pp. 66.
Splunk Enterprise 8.0.0 Overview, available online, retrieved May 20, 2020 from docs.splunk.com, pp. 17.
Splunk Quick Reference Guide, updated 2019, available online at https://www.splunk.com/pdfs/solution-guides/splunk-quick-reference-guide.pdf, retrieved May 20, 2020, pp. 6.

* cited by examiner

← → C ⌂ | 🗎 www.splunkaroni.com:49159/en-US/app/launcher/home splunk>  Administrator ▾  Messages ▾  Settings ▾  Activity ▾  Help ▾  | Find main
Indexes > main

Update Index Settings

Index name
main

Time to live (in Days) of Events
90
Number of days after which indexed data is marked for deletion or archive. (Default = 1,825 (5 years); Min = 0; Max = 36,500) <link to documentation>

Max Size (in GB) of entire index
600    (Current Storage Available = 49 GB) ← 502
Maximum target size of entire index. If exceeded, oldest data is marked for deletion or archive. (Default = 500,000; Min = 0; Max = 4,000,000 (4 PB)) <link to documentation>

Access Policy
3
The minimum permission level required to access the index. (Default = 2; Min = 0; Max = 4) <link to documentation>

Index Information
Current Index Size = 50 GB
Event Count = 4.95 M
Earliest Event = January 1, 2014; 1:12:00 PM
Latest Event = March 30, 2014; 10:00:00 PM
App = poc4_all_indexes
Status = enabled

[Delete Index]    Delete Index will delete the index <link to documentation>
[Clean Index]    Clean Index will delete all data in the index <link to documentation>

[Cancel]    [Save]

← → C ⌂ | www.splunkaroni.com:49159/en-US/app/launcher/home splunk<>     Administrator ∨ Messages ∨ Settings ∨ Activity ∨ Help ∨ | Find

Add new index
Indexes > Add new

Specify Index Settings

Index name
[ Server_Data ]
Set index name (e.g., INDEX_NAME). Search using index=INDEX_NAME. <link to documentation>

Time to live (in Days) of Events
[ 90 ]
Number of days after which indexed data is marked for deletion or archive. (Default = 1,825 (5 years); Min = 0; Max = 36,500) <link to documentation>

Max Size (in GB) of entire index
[ 500 ]   (Current Storage Available = 49 GB) ← 502
Maximum target size of entire index. If exceeded, oldest data is marked for deletion or archive. (Default = 500; Min = 0; Max = 4000,000 (4 PB)) <link to documentation>

Access Policy
[ 2 ]
The minimum permission level required to access the index. (Default = 2; Min = 0; Max = 4) <link to documentation>

Estimated time require to create index = 10 min
Restart Required = No

[ Cancel ]   [ Save ]

Original Search: 1501
search "error" | stats count BY host

Sent to peers: 1502
search "error" | prestats count BY host(map)

Executed by search head: 1503
Merge prestats results received from peers (reduce)

FIG. 13

Search Screen 1600

| Search | Pivot | Reports | Alerts | Dashboards | | Search & Reporting |

Q New Search
Save as menu → Save As ⌄

Search Bar 1602 — buttercupgames
Time Range Picker 1612 — All time ⌄ | 🔍 Close ✓ 36,819 events (before 4/30/14 2:19:02.000 PM) | Job ⌄ ▐▐ ■ ↱ ⎙ ⊥ | ● Smart Mode ⌄

Events (36,819) | Statistics | Visualization ← Search Results Tabs 1604

Search action buttons ↙  ↘ Search mode selector

Format Timeline ⌄ | − Zoom Out | + Zoom to Selection | × Deselect

[Timeline 1605 — histogram] 1 hour per column

List ⌄ | Format ⌄ | 20 Per Page ⌄ | ‹Prev 1 2 3 4 5 6 7 8 9 ... Next›

| | i | Time | Event |
|---|---|---|---|
| Fields Sidebar 1606 | | | Events List 1608 |
| ‹ Hide Fields ≡ All Fields | › | 4/28/14<br>6:22:16.000 PM | 91.205.189.15 - - [28/Apr/2014:18:22:16] "GET /oldlink?itemId=EST-14&JSESSIONID=SD6SL7FF<br>7ADFF53113 HTTP 1.1" 200 1665 "http://www.buttercupgames.com/oldlink?itemId=EST-14" "Moz<br>illa/5.0 (Windwos NT 6.1; WOW 64) AppleWebKit/536.5 (KHTML, like Gecko) Chrome/19.0.1084.<br>46 Safari/536.5" 159<br>host = www2 ┊ source = tutorialdata.zip:./www2/access.log ┊ sourcetype = access_combined_wcookie |
| Selected Fields<br>a host 3<br>a source 3<br>a sourcetype 1 | › | 4/28/14<br>6:20:56.000 PM | 182.236.164.11 - - [28/Apr/2014:18:20:56] "GET /cart.do?action=addtocart&itemId=EST-15&p<br>roductId=85-AG-G09&JSESSIONID=SD6SL8FF10ADFF53101 HTTP 1.1" 200 2252 "http://www.butterc<br>upgames.com/oldlink?itemId=EST-15" "Mozilla/5.0 (Macintosh; Intel Mac OS X 10_7_4) Apple<br>WebKit/536.5 (KHTML, like Gecko) Chrome/19.0.1084.46 Safari/536.5" 506<br>host = www1 ┊ source = tutorialdata.zip:./www1/access.log ┊ sourcetype = access_combined_wcookie |
| Interesting Fields<br>a action 5<br># bytes 100+<br>a categoryId 8<br>a clientip 100+<br># date_hour 24<br># date_mday 8<br># date_minute 60 | › | 4/28/14<br>6:20:55.000 PM | 182.236.164.11 - - [28/Apr/2014:18:20:56] "POST /oldlink?itemId=EST-18&JSESSIONID=SD6SL8<br>FF10ADFF53101 HTTP 1.1" 408 893 "http://www.buttercupgames.com/product.screen?productId=<br>SF-BVS-G01" "Mozilla/5.0 (Macintosh; Intel Mac OS X 10_7_4) AppleWebKit/536.5 (KHTML, li<br>ke Gecko) Chrome/19.0.1084.46 Safari/536.5" 134<br>host = www1 ┊ source = tutorialdata.zip:./www1/access.log ┊ sourcetype = access_combined_wcookie |

*FIG. 14A*

| Data Summary | | | |
|---|---|---|---|
| Hosts (5) | Sources (8) | Sourcetypes (3) | ✗ |
| filter | | | |
| Host ⬍ | | Count ⬍ | Last Update ⬍ |
| mailsv | ᓵ | 9,829 | 4/29/14 1:32:47.000 PM |
| vendor_sales | ᓵ ⌄ | 30,244 | 4/29/14 1:32:46.000 PM |
| www1 | ᓵ ⌄ | 24,221 | 4/29/14 1:32:44.000 PM |
| www2 | ᓵ ⌄ | 22,595 | 4/29/14 1:32:47.000 PM |
| www3 | ᓵ ⌄ | 22,975 | 4/29/14 1:32:45.000 PM |

*FIG. 14B*

INCIDENT REVIEW DASHBOARD 1710

Incident Review | Actions ▼

Status: [ ]  Urgency: [high]  Owner: [ ]  Title: [ ]

Security domain: [ ]  Governance: [pci]  Search: [ ]

INCIDENT ATTRIBUTE FIELDS 1711

TIME RANGE FIELD 1712

[24 hour window ▼]
- Last 15 minutes
- Last 60 minutes
- Last 4 hours
- Last 24 hours
- Last 7 days
- Last 30 days
- Last year
- Real-time
- Other
- All time
- Custom time...

✓ 225 matching events  [ ◀ ] [ i ] [ 🖫 Save ▼ ] [ 🗗 ] [ 🖶 Create ▼ ]  Linear scale ▼  1 bar = 1 hour ◀ Hide   ⊕ Zoom out   ⊕ Zoom to selection   [↙] Deselect

TIMELINE 1713

120 / 60

4:00 AM Sun Aug 26 2012    6:00 AM    8:00 AM

225 events in a 24 hour window (real-time) (from 11:29:20 AM August 25 to 11:29:20 AM August 26, 2012)

Select all | Unselect all   « prev  [1] 2 3 4 5 6 7 8 9 10 next »   | Edit selected events | Edit all 225 matching

EVENTS LIST 1714

| Select | Options | Time | Security Domain | Title | Urgency | Status | Owner | |
|---|---|---|---|---|---|---|---|---|
| ☐ | ▶ | 8/26/12 11:11:03.000 AM | Access ▼ | Insecure Or Cleartext Authentication Detected ▼ | ⊙ High ▼ | New ▼ | unassigned ▼ | View details |
| ☐ | ▶ | 8/26/12 11:10:07.000 AM | Access ▼ | Insecure Or Cleartext Authentication Detected ▼ | ⊙ High ▼ | New ▼ | unassigned ▼ | View details |
| ☐ | ▶ | 8/26/12 11:00:39.000 AM | Access ▼ | Account (blinebry) Deleted On (PROD·POS-001) ▼ | ⊙ High ▼ | New ▼ | unassigned ▼ | View details |
| ☐ | ▶ | 8/26/12 11:00:39.000 AM | Access ▼ | Account (beu) Deleted On (COREDEV·006) ▼ | ⊙ High ▼ | New ▼ | unassigned ▼ | View details |
| ☐ | ▶ | 8/26/12 11:00:39.000 AM | Access ▼ | Account (combs) Deleted On (HOST-005) ▼ | ⊙ High ▼ | New ▼ | unassigned ▼ | View details |
| ☐ | ▶ | 8/28/12 | Access ▼ | Account (wisner) Deleted On (BUSDEV-005) ▼ | ⊙ High ▼ | New ▼ | unassigned ▼ | View details |

ASSIGNING RAW DATA SIZE OF SOURCE DATA TO STORAGE CONSUMPTION OF AN ACCOUNT

CROSS-REFERENCE TO RELATED APPLICATIONS

This application is a Continuation of U.S. patent application Ser. No. 16/738,175 filed Jan. 9, 2020 and titled "Tracking Processed Machine Data," which itself is a Continuation of U.S. patent application Ser. No. 14/610,777 filed Jan. 30, 2015 and titled "Systems And Methods For Managing Allocation Of Machine Data Storage," the entire contents of each are incorporated by reference herein in their entirety.

TECHNICAL FIELD

The present disclosure is generally directed to data processing, and more particularly, to managing storage of machine data.

BACKGROUND

Modern data centers often comprise thousands of hosts that operate collectively to service requests from even larger numbers of remote clients. During operation, components of these data centers can produce significant volumes of machine-generated data. The unstructured nature of much of this data has made it challenging to perform indexing and searching operations because of the difficulty of applying semantic meaning to unstructured data. As the number of hosts and clients associated with a data center continues to grow, processing large volumes of machine-generated data in an intelligent manner and effectively presenting the results of such processing continues to be a priority.

BRIEF DESCRIPTION OF THE DRAWINGS

FIG. 5A illustrates an example index editing GUI in accordance with the disclosed embodiments.

FIG. 5B illustrates an example index creation GUI in accordance with the disclosed embodiments.

FIG. 13 illustrates an example search query received from a client and executed by search peers in accordance with the disclosed embodiments.

FIG. 14A illustrates an example search screen in accordance with the disclosed embodiments.

FIG. 14B illustrates an example data summary dialog that enables a user to select various data sources in accordance with the disclosed embodiments.

FIG. 15B illustrates an example incident review dashboard in accordance with the disclosed embodiments.

DETAILED DESCRIPTION

Figure 1:
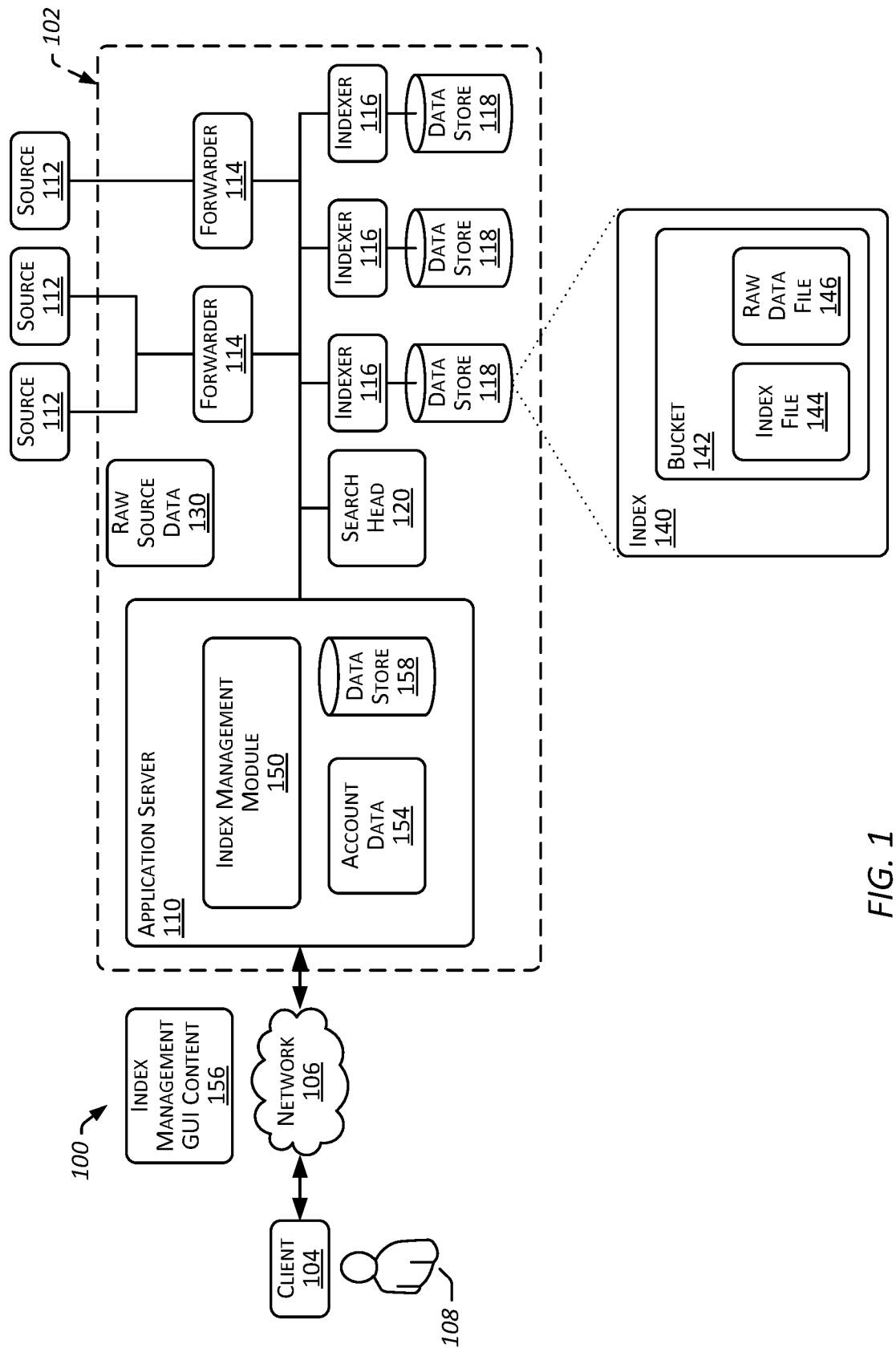
FIG. 1 illustrates an example data processing environment in accordance with the disclosed embodiments.

The present disclosure is directed to managing storage of machine data. In some embodiments, a user can purchase and use a given amount of data storage capacity for an account of a data processing system, and the purchased storage capacity can be used to store machine data for the account. In some embodiments, a determination of how much of the purchased storage capacity has been consumed by stored data is based on the size of the data as it is received, and not the actual storage footprint of the stored data (e.g., the actual amount of memory used to store the data). Thus, for example, if a user has initially purchased 1,000 GB (gigabytes) of storage capacity, and 900 GB of raw data for the account has been received and processed by the data processing system, which results in 1,100 GB of data stored on the system, it can be determined that the account has only consumed 900 GB of its 1,000 GB capacity, despite the actual storage footprint of the data being 1,100 GB, which is larger than the initially purchased 1,000 GB.

In the context of managing storage of machine data (e.g., machine data received from one or more data sources, such as data streaming from packaged and custom applications, application servers, web servers, databases, wire data from networks, virtual machines, telecom equipment, operating systems, sensors, and/or the like), raw machine data associated with an account may be received by a data event processing system, the raw machine data may be indexed, and the resulting indexed data may be stored in one or more indexes. In some instances, the indexed data may be larger or smaller in size than the corresponding raw machine data. This difference may be attributable to processing the raw data, such as adding metadata, compression, replication and/or the like. For example, the indexed data may have a larger footprint as a result of appending additional metadata to the raw data, the indexed data may have a smaller footprint as a result of compressing the indexed data, the indexed data may have a larger footprint as a result of replicating the indexed data, and/or the like. In some instances, storage consumption (also referred to as the "allocated size") for the account may be determined based on the size of the raw data corresponding to the indexed data currently stored for the account, not the actual storage footprint of the stored indexed data. Thus, for example, if a user has initially purchased 1,000 GB of storage capacity, and 900 GB of raw machine data for the account has been indexed by the data processing system, which results in 1,100 GB of indexed machine data stored on the system (e.g., after the machine data is compressed and replicated during an indexing operation), it can be determined that the user account has only consumed 900 GB of its initially purchased 1,000 GB capacity (e.g., the user account has used 900 GB of its allocated data size), despite the actual storage footprint of the indexed data being 1,100 GB.

In some embodiments, an index management overview graphical user interface (GUI) can be provided for presenting information relating to the purchased storage capacity and/or the currently consumed storage (or "allocated storage"). For example, as described herein, an index management overview GUI can be provided for display to a user, and the index management overview GUI may provide information such as: an indication of the total storage capacity purchased (e.g., how storage space has been purchased for the account); an aggregate of the storage consumption (e.g., how much of the purchased storage space is being used to store data); the storage consumption by the different indexes (e.g., how much data is stored in the various indexes associated with the account); and the storage availability (e.g., how much of the purchased storage space is not being consumed by the storage of data, and is available for the storage of additional data).

In some embodiments, the consumption (or "allocation") of storage can be monitored, and one or more actions can be performed in response to determining that the amount of allocated data exceeds one or more data storage thresholds. For example, in response to determining that the allocated data is at or above the purchased amount for an account (or a given percentage thereof), the system may send warning indicators and/or messages, delete at least some of the data from the account's indexes, inhibit access to the account's indexes, inhibit intake of additional raw machine data for the account, inhibit processing of additional raw machine data for the account, charge an overage fee to the account, automatically increase the account's subscription by automatically purchasing a larger amount of storage capacity, and/or the like. In some embodiments, an amount of allocated storage can be used to determine a fee or cost, such a fee to be charged for the use of the allocated storage.

Turning now to the figures, FIG. 1 illustrates an example data processing environment ("environment") 100 in accordance with the disclosed embodiments. In some embodiments, the environment 100 can include an event-processing system ("system") 102 communicatively coupled to one or more client devices 104 via a communications network 106. The client device 104 may be used or otherwise accessed by a user 108, such as a system administrator or a customer.

In some embodiments, the system 102 can include an application server 110, one or more data sources ("sources") 112, one or more forwarders 114, one or more indexers 116, one or more index data stores 118, and/or one or more search heads 120. As described herein, raw source data ("source data") 130 can be received from one or more data sources 112. The source data 130 may be indexed and stored in one or more indexes 140.

As further described, an index 140 can include one or more buckets 142, and each of the buckets 142 can include an index file 144 and/or a raw data file 146. A raw data file 146 may include source data 130 in compressed form. An index file 144 may include index data that points to the location of certain data within the raw data file 146.

A bucket 142 may be a directory containing part of an index 140. An index 140 may consist of many buckets 142 organized, for example, by age, and which may roll through one or more stages in their transition to retirement and eventual archiving or deletion. The stages may include a hot stage, a warm stage, a cold stage, a frozen stage, and a thawed stage. The data may transition across the stages in the following order as the data ages: hot, warm, cold, frozen, thawed. Each of the stages may be associated with a corresponding bucket that holds data for that stage. A hot bucket may be a location to store data subject to intensive read and write operations, e.g., where the indexing occurs. A warm bucket may be a location to store data subjected to mostly read and optimization operations. A cold bucket may be a location to store data subjected to search operations. The frozen bucket may be a location to store data that is queued for deletion or archiving. A thawed bucket may be used to re-import data from frozen buckets. Freshly indexed data may start out in a hot bucket that is actively being written to. The data of a hot bucket may be stored temporarily in a memory location, such as in flash memory. When the hot data bucket reaches a specified size or age, it may be transitioned into (or "rolled to") warm data bucket, and a new hot data bucket may be created. Similar to the hot bucket, the data of a warm bucket may be stored temporarily in a memory location, such as in flash memory. After some time, the warm bucket may transition into a cold bucket. The data of a cold bucket may be stored in a more permanent location that remains searchable, such as a hard drive. A cold bucket may eventually transition into a frozen bucket, and a frozen bucket may be deleted or archived. The data of a frozen bucket may be stored an archive that is not readily searchable, such as a tape drive. If data is to be returned to a cold bucket, it may be moved in a thawed bucket, during its transition from the frozen bucket to the cold bucket, such as during its transition from a tape drive to the hard drive. For example, a "homePath" may specify a directory or location for the hot and/or warm buckets (e.g., $SPLUNK_HOME/var/lib/splunk/defaultdb/db/), a "coldPath" may specify a directory or location for a cold bucket (e.g., $SPLUNK_HOME/var/lib/splunk/defaultdb/colddb/), a "thawedPath" may specify a directory or location for a thawed bucket (e.g., $SPLUNK_HOME/var/lib/splunk/defaultdb/thaweddb/), and so forth. The states of various buckets and/or the discarding or archiving of data may be based on data retention settings for the index 140. The data retention settings for an index may be specified by an index definition.

A raw data file 146 may be a compressed file in an index bucket 142 that contains event data, as well as journal information that the indexer can use to reconstitute the index's metadata files ("index files"). A searchable copy of a bucket 142 may contain both the raw data file 146 and a corresponding set of index files 144. A non-searchable copy (e.g., stored for the purposes of redundancy, but not immediate searching) may contain only the raw data file 146. Such a non-searchable copy may take up less disk space, and can be converted into a searchable copy with some processing.

An index management module 150 (e.g., executed by the application server 110) may track the path of source data 130 as it passes into and/or through the system 102. In some embodiments, the tracking of the source data 130 can include determining a raw data size associated with one or more portions of the source data 130 and tracking what data remains stored on the system 102. In some embodiments, the index management module 150 can determine an allocated data size for an account that corresponds to the indexed data for the account that is stored on the system. The allocated data size may be the size of the raw data that corresponds to the indexed data for the account that is stored on the system. In some embodiments, the index management module 150 can provide for the display of an index management overview graphical user interface (GUI). Such an index management overview GUI can be displayed on a client device 104, and can present information relating to a purchased storage capacity and/or currently consumed storage (or "allocated storage"). For example, as described herein, the index management module 150 can provide, to a client device 104, index management GUI content 156 that includes an index management overview GUI for display to a user. The index management overview GUI may provide information such as: an indication of the total storage capacity purchased (e.g., how much storage space has been purchased for the account); an aggregate of the storage consumption (e.g., how much of the purchased storage space is being used to store data); the storage consumption by the different indexes (e.g., how much data is stored in the various indexes associated with the account); and the storage availability (e.g., how much of the purchased storage space is not being consumed by the storage of data, and is available for the storage of additional data). In some embodiments, the index management module 150 can monitor the consumption (or "allocation") of storage, and perform and/or cause one or more actions in response to determining that the amount of allocated data exceeds one or more data storage thresholds. For example, in response to determining that the allocated data is at or above the purchased amount for an account (or a given percentage thereof), the index management module 150 may cause the system to send warning messages and/or indicators, delete at least some of the data from the account's indexes, inhibit access to the account's indexes, inhibit intake of additional raw machine data for the account, inhibit processing of additional raw machine data for the account, charge an overage fee to the account, automatically increase the account's subscription by automatically purchasing a larger amount of storage capacity, and/or the like. In some embodiments, the determined amount of allocated storage can be used to determine a fee or cost, such a fee to be charged for the use of the allocated storage.

The network 106 may include an element or system that facilitates communication between the entities of the environment 100 (e.g., including the application server 110 and the client devices 104). The network 106 may include an electronic communications network, such as the Internet, a local area network (LAN), a wide area network (WAN), a wireless local area network (WLAN), a cellular communications network, and/or the like. In some embodiments, the network 106 can include a wired or a wireless network. In some embodiments, the network 106 can include a single network or a combination of networks.

A client device 104 may include any variety of electronic devices. In some embodiments, a client device 104 can include a device capable of communicating information via the network 106. A client device 104 may include one or more computer devices, such as a desktop computer, a server, a laptop computer, a tablet computer, a wearable computer device, a personal digital assistant (PDA), a smart phone, and/or the like. In some embodiments, a client device 104 may be a client of the application server 110. In some embodiments, a client device 104 can include various input/output (I/O) interfaces, such as a display (e.g., for displaying a graphical user interface (GUI)), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 104 can include general computing components and/or embedded systems optimized with specific components for performing specific tasks. In some embodiments, a client device 104 can include programs/applications that can be used to generate a request for content, to provide content, to render content, and/or to send and/or receive requests to and/or from other devices via the network 106. For example, a client device 104 may include an Internet browser application that facilitates communication with the application server 110 via the network 106. In some embodiments, a program, or application, of a client device 104 can include program modules having program instructions that are executable by a computer system to perform some or all of the functionality described herein with regard to at least the client device 104. In some embodiments, a client device 104 can include one or more computer systems similar to that of the computer system 1000 described below with regard to at least FIG. 8.

The application server 110 may include a computing device having network connectivity and being capable of providing one or more services to network clients, such as a client device 104. These services may include ingesting, processing, storing, monitoring, and/or searching data. Although certain embodiments are described with regard to a single server for the purpose of illustration, embodiments may include employing multiple servers, such as a plurality of distributed servers. In some embodiments, the application server 110 can include one or more computer systems similar to that of the computer system 1000 described below with regard to at least FIG. 8.

The data store 158 may include a medium for the storage of data thereon. For example, the data store 158 may include a non-transitory computer-readable medium storing data thereon that is accessible by entities of the environment 100, such as the application server 110. In some embodiments, the data store 158 may store the index management module 150, and/or account data 154. The account data 154 may include, for example, a maximum storage capacity (e.g., purchased storage capacity) for one or more accounts of the system 102. Although certain embodiments are described with regard to a single data store 158 for the purpose of illustration, embodiments may include employing multiple data stores 158, such as a plurality of distributed data stores 158.

A data source (also referred to as a "source" or "data input") 112 may be a source of incoming source data (also referred to as "event data") 130 being fed into the system 102. A data source 112 may include one or more external data sources, such as web servers, application servers, databases, firewalls, routers, operating systems, and software applications that execute on computer systems, mobile devices, sensors, and/or the like. A data source 112 may be located remote from the system 102. For example, a data source 112 may be defined on an agent computer operating remote from the system 102, such as on-site at a customer's location, that transmits source data 130 to one or more forwarders 114 via a communications network (e.g., network 106). A data source 112 may be local to (e.g., integrated with) the system 102. For example, a data source 112 may be defined on a forwarder 114. In some embodiments, the data sources 112 can be the same or similar to the data sources 1105 described below with regard to at least FIG. 9. In some embodiments, a source 112 can include one or more computer systems similar to that of the computer system 1000 described below with regard to at least FIG. 8.

The source data 130 can be a stream or set of data fed to an entity of the system 102, such as a forwarder 114. In some embodiments, the source data 130 can be heterogeneous machine-generated data received from various sources 112, such as servers, databases, applications, networks, and/or the like. The source data 130 may include, for example, raw time-series data, such as server log files, activity log files, configuration files, messages, network packet data, performance measurements, sensor measurements, and/or the like. For example, the source data 130 may include log data generated by a server during the normal course of operation (e.g., server log data). In some embodiments, the source data 130 may be minimally processed to generate minimally processed source data (sometimes referred to herein as simply "source data"). For example, the source data 130 may be received from a source 112, such as a server. The source data 130 may, then, be subjected to a small amount of processing to break the data into events. As discussed below, an "event" may refer to a portion, or a segment, of the data that is associated with a time. And, the resulting events may be indexed (e.g., stored in a raw data file 146 associated with an index file 144). In some embodiments, indexing the source data 130 may include additional processing, such as compression, replication, and/or the like. Compressing source data 130 may generate a compressed version of the source data 130 that has a smaller size (e.g., a smaller storage footprint) than the uncompressed version of the corresponding source data 130. For example, a raw data file 146 that includes 1,000 blocks of source data 130 may be compressed by 50% such that the raw data file 146 has a footprint that is about 50% of a footprint of the uncompressed version of the raw data file 146. Similarly, each of the 1,000 blocks of source data 130 contained in the raw data file 146 may be associated with a storage footprint that is about 50% of their respective uncompressed sizes. Replicating source data 130 may include storing multiple copies of the source data 130. For example, a raw data file 146 that includes 1,000 blocks of source data 130 may be stored in three different indexes 140. Such replication can increase the storage footprint associated with the raw data file 146 and each of the 1,000 blocks of source data. For example, if a copy of raw data file 146 that includes 1,000 blocks of source data 130 is stored in three locations, such as in three different indexes 140, then the raw data file 146 may be associated with a data storage footprint that is three times the size of the data storage footprint for the single, un-replicated copy of the raw data file 146. Similarly, each of the 1,000 blocks of source data 130 contained in the raw data file 146 may be associated with a storage footprint that is about three times of its uncompressed size. Thus, an allocated size associated with stored source data 130 may be different from the size of a corresponding piece of incoming source data 130. For example, a block of source data 130 having a size of 1 KB (kilobyte) that is subjected to 50% compression, and 3× (3 times) replication, may be associated with an allocated size of about 1.5 KB.

An event may be represented by a data structure that is associated with a certain point in time and includes a portion of raw machine data (e.g., a portion of machine-generated data that has not been manipulated). As described herein, an event may include, for example, a line of data that includes a time reference (e.g., a timestamp), and one or more other values. An event may store values that can be extracted to determine field values. Fields may be defined by "extraction rules" that are applied to data in the events to extract values for specific fields. More specifically, the extraction rules for a field can include one or more instructions that specify how to extract a value for the field from the event data. Extraction rules are discussed in more detail below with regard to at least FIG. 11 and the SPLUNK® ENTERPRISE system.

In the context of server log data, for example, an event may correspond to a log entry for a client request and include the following values: (a) a time value (e.g., including a value for the date and time of the request, such as a timestamp), and (b) a series of other values including, for example, a page value (e.g., including a value representing the page requested), an IP (Internet Protocol) value (e.g., including a value for representing the client IP address associated with the request), and an HTTP (Hypertext Transfer Protocol) code value (e.g., including a value representative of an HTTP status code), and/or the like. That is, each event may be associated with one or more values. Some events may be associated with default values, such as a host value, a source value, a source type value and/or a time value. Default value may be common to some of all events of a set of source data.

In some embodiments, an event can be associated with one or more characteristics that are not represented by the data initially contained in the raw data, such as characteristics of the host, the source, and/or the source type associated with the event. In the context of server log data, for example, if an event corresponds to a log entry received from Server A, the host and the source of the event may be identified as Server A, and the source type may be determined to be "server." In some embodiments, value representative of the characteristics may be added to (or otherwise associated with) the event. In the context of server log data, for example, if an event is received from a Server A, a host value (e.g., including a value representative of Server A), a source value (e.g., including a value representative of Server A), and a source type value (e.g., including a value representative of a "server") may be appended to (or otherwise associated with) the corresponding event.

In some embodiments, events can correspond to data that is generated on a regular basis and/or in response to the occurrence of a given event. In the context of server log data, for example, a server that logs activity every second may generate a log entry every second, and the log entries may be stored as corresponding events of the source data. Similarly, a server that logs data upon the occurrence of an error event may generate a log entry each time an error occurs, and the log entries may be stored as corresponding events of the source data.

In some embodiments, the source data 130 can include a compilation of any number of events based on data received from any number of sources. For example, the source data 130 may include events corresponding to log entries (or other time referenced event data) received from any number of servers, databases, applications, networks, and/or the like. Thus, a single set of source data 130 may include a compilation of machine data ingested from any number of different sources.

In some embodiments, the source data 130 can be searched to identify one or more portions of the source data 130 that satisfy specified search criteria. Source data 130 may be accessible by time-based searching. For example, if a search query requests data generated by a given server (e.g., Server A) over a given time period (e.g., 9 am-12 pm), one or more indexers 116 can perform a search of the source data 130 stored in the indexes 140 to retrieve events that are from the given server and that are associated with the given time period (e.g., events based on log data received from Server A from 9 am-12 pm). In the context of server log data, for example, if a user is interested in log data generated by Server A, the user may submit a search query to identify the events of the source data 130 that were generated by Server A. For example, if the source data includes 10,000 events corresponding to log data from multiple servers, databases, applications, networks, and/or the like, and only 100 events of the 10,000 events correspond to log data generated by Server A, the results of the above search query may include a subset of the source data including only the 100 events that correspond to log data generated by Server A. As described herein, a search definition may be referred to generally as an "object" or a "data model object," and results corresponding to the search may be referred to generally as an "object dataset." Thus, if an object defines a search of events, an object dataset may refer to the events identified as being responsive to the search.

A forwarder 114 may be an entity of the system 102 that forwards data to another entity of the system, such as an indexer 116, another forwarder 114, or a third-party system. An entity that receives data from a forwarder 114, such as an indexer 116, may be referred to as a receiver entity. There can be different types of forwarders 114. A universal forwarder may be a streamlined, dedicated forwarder 114 that contains only the essential components needed to forward data. A heavy forwarder may be a forwarder 114 with some features disabled to achieve a smaller footprint. A light forwarder may be a forwarder 114 with most features disabled to achieve as small a footprint as possible. A universal forwarder may not provide much, if any, processing of the data and, thus, may be used to forward unparsed data (e.g., forward the source data 130 to an indexer 116). A light forwarder may provide some processing of the data, such as data parsing and, thus, may be used to parse the raw data and forward the resulting parsed data to an indexer 116. A heavy forwarder may provide some processing of the data, such as data parsing, assessment of events identified by the parsing, and/or routing the resulting parsed data to particular forwarders 114 based on the contents of the identified events. In some embodiments, the forwarders 114 can be the same or similar to the forwarders 1101 described below with regard to at least FIG. 9. In some embodiments, a forwarder 114 can include one or more computer systems similar to that of the computer system 1000 described below with regard to at least FIG. 8.

An indexer 116 may be an entity of the system 102 that indexes data, transforming source data 130 into events and placing the results into an index 140. An indexer 116 may also search indexes 140 in response to search requests. An indexer 116 may perform other functions, such as data input and search management. In some instances, the forwarders 114 handle data input, and forward the source data 130 to the indexers 116 for indexing. An indexer 116 may perform searches across its own stored data (e.g., the data of indexes 140 stored in an index data store 118 managed by the indexer 116). In some instances, a search head 120 can handle search management and coordinate searches across multiple indexers 116. In some embodiments, the indexer 116 can be the same or similar to the indexers 1102 described below with regard to at least FIG. 9. In some embodiments, an indexer 116 can include one or more computer systems similar to that of the computer system 1000 described below with regard to at least FIG. 8.

An indexer 116 is sometimes referred to by more specific terms, according to its context. For example, a search peer may refer to an indexer 116 in a distributed search topology, and a peer node may refer to an indexer 116 in an indexer cluster. An indexer cluster may be a group of indexers 116 configured to replicate external data so that it maintains multiple copies of the data. Replication of the indexes 140 may improve data availability, data fidelity, disaster tolerance, and search performance. An indexer cluster node may be one of the entities (e.g., an indexer 116) that makes up an indexer cluster. Each indexer cluster may include the following: one master node, one or more peer nodes, and one or more search heads. The term "indexer cluster node" may refer to the master node and the peer nodes, but a search head 120 can also be considered a type of cluster node. A single-site indexer cluster may be an indexer cluster in which all nodes reside on a single physical site. A multisite indexer cluster may be an indexer cluster that spans multiple physical sites, such as different data centers that are remote from one another. Each site may have its own set of peer nodes and search heads 120. Each site may also obey site-specific replication and search factor rules.

An index data store 118 may include a medium for the storage of data thereon. For example, a data store 118 may include a non-transitory computer-readable medium storing data thereon that is accessible by entities of the environment 100, such as the corresponding indexer 116. The data may include, for example, one or more indexes 140 including one or more buckets 142, and the buckets 142 may include an index file 144 and/or a raw data file 146 (e.g., including parsed, time-stamped events). In some embodiments, each data store 118 is managed by a given indexer 116 that stores data to the data store 118 and/or performs searches of the data stored on the data store 118. Although certain embodiments are described with regard to a single data store 118 for the purpose of illustration, embodiments may include employing multiple data stores 118, such as a plurality of distributed data stores 118. In some embodiments, an index data store 118 is the same or similar to the data stores 1103 described below with regard to at least FIG. 9.

A search head 120 may be an entity of the system 102 that handles search requests and/or consolidates the search results for presentation to a user. In a distributed search environment (e.g., including multiple indexers 116), a search head 120 may distribute search requests across a set of indexers 116 that perform the actual searching to generate individual sets of search results, and then merge the individual sets of search results into a consolidated set of search results that are provided to the user. In a non-distributed search environment (e.g., including only a single indexer 116), the indexer 116 may assume the role of a search head 120 and may handle the search management, as well as the indexing and searching functions. An entity of the system 102 may function as both a search head 120 and a search peer. If an entity does only searching (and not any indexing), it is usually referred to as a dedicated search head. A search head cluster may be a group of search heads 120 that serves as a central resource for searching. The search heads 120 in a search head cluster may be interchangeable. Thus, for example, the same searches, dashboards, knowledge objects, and so on may be run or accessed from any member of the cluster. To achieve this interchangeability, the search heads 120 in the cluster may share configurations, applications, search artifacts, and job loads. In some embodiments, a search head 120 is the same or similar to the search head 1104 described below with regard to at least FIG. 9. In some embodiments, the search head 120 can include one or more computer systems similar to that of the computer system 1000 described below with regard to at least FIG. 8.

The process of indexing data may be part of a larger sequence of processing data. In some embodiments, a "data pipeline" refers to a route that data takes through an event-processing system 102, from its origin in sources, such as log files and network feeds, to its transformation into searchable events that encapsulate valuable knowledge. Such a data pipeline may include, for example, an input segment, a parsing segment, an indexing segment, and a search segment. Each segment may be conducted by one or more entities of the system 102, such as one or more forwarders 114, one or more indexers 116, and/or one or more search heads 120 of the system 102.

During the input segment (e.g., the first segment of the data pipeline), the system 102 may acquire a raw data stream (e.g., source data 130) from its source (e.g., a source 112), break it into blocks (e.g., 64K blocks of data), and/or annotate each block with metadata keys. After the data has been input, it may be moved to the next segment of the pipeline (parsing). The data input segment may be conducted, for example, by a forwarder 114 and/or an indexer 116 of the system 102. In some instances, a parsing queue in the data pipeline holds data after it enters the system but before parsing (a first phase of the event processing) occurs. Thus, incoming data may first go to the parsing queue and from there to the parsing segment.

During the parsing segment (e.g., the second segment of the data pipeline), the system 102 may conduct parsing, a first stage of the event processing of the raw data (e.g., the source data 130). This can include, for example, extracting a set of default fields for each event, including host, source and source type, configuring character set encoding, identifying line termination using line breaking rules, identifying event boundaries, identifying event timestamps (or creating them if they don't exist), masking sensitive event data (such as credit card or social security numbers), applying custom metadata to incoming events, and/or the like. Accordingly, during this first stage of event processing, the raw data may be data broken into individual events, and the parsed data may be moved to the next segment of the pipeline (indexing). The parsing segment may be conducted, for example, by a heavy forwarder 114 and/or an indexer 116 of the system 102.

During the indexing segment (e.g., the third segment of the data pipeline), the system 102 may perform indexing of the parsed data, a second stage of the event processing. This can include, for example, breaking all events into segments that can then be searched upon, building the index data structures, and writing the raw data and index files to disk, where post-indexing compression occurs. Accordingly, during the second stage of the event processing, the parsed data (also referred to as "events") may be written to a search index on disk (e.g., written to an index 140 in an index data store 118). The indexing segment may be conducted, for example, by an indexer 116 of the system 102. In some embodiments, both parsing and indexing can take place on the same indexer 116. In some embodiments, an index queue in the data pipeline holds parsed events waiting to be indexed. Thus, incoming data may go from the parsing queue to the parsing segment of the pipeline where it undergoes parsing, and the processed data may move to the index queue and ultimately on to the indexing segment, where the index is built.

In some embodiments, indexing can include performing data processing that modifies the data's storage footprint. For example, indexing can include compressing data, replicating data, and/or generating metadata associated with the data, such as an index file. In some embodiments, indexing can include compressing the source data 130 used to generate the raw data file 146 and/or the raw data file 146. For example, indexing may include compressing a raw data file 146 that includes 1,000 blocks of source data 130 by 50% such that the raw data file 146 has a footprint that is about 50% of a footprint of the uncompressed version of the raw data file 146. Similarly, each of the 1,000 blocks of source data 130 contained in the raw data file 146 may be associated with a storage footprint that is about 50% of its respective uncompressed size. In some embodiments, indexing can include replicating the source data 130 used to generate the raw data file 146 and/or the raw data file 146. For example, indexing can include replicating a raw data file 146 that includes 1,000 blocks of source data 130 such that it is stored in three different indexes 140. Such replication can increase the storage footprint associated with the raw data file 146 and each of the 1,000 blocks of source data 130. For example, if a copy of a raw data file 146 that includes 1,000 blocks of source data 130 is stored in three locations, such as in three respective indexes 140, then the raw data file 146 may be associated with a data storage footprint that is three times the size of the data storage footprint for the single, un-replicated copy of the raw data file 146. Similarly, each of the 1,000 blocks of source data 130 contained in the raw data file 146 may be associated with a storage footprint that is about three times of its uncompressed size. Thus, an allocated size associated with processed and stored source data 130 may be different from the size of a corresponding piece of "raw" incoming source data 130. For example, a raw block of source data 130 having a size of 1 KB (kilobyte) that is subjected to 50% compression, and 3× replication, may have an actual storage footprint of about 1.5 KB, as opposed to its "raw" received size of 1 KB.

During the searching segment (e.g., the fourth segment of the data pipeline), the system 102 may conduct searches of the indexed data to identify and access data that is responsive to search queries. This can include, for example, identifying stored events in a raw data that are responsive to user specified search criteria. For example, if indexed data is stored in a data store 118 of an indexer 116, and the indexer 116 is assigned a search task by the search head 120, then the indexer 116 may search the data store 118 for data responsive to the search and send any responsive data back to the search head 120. The search head 120 may send similar search tasks to other indexers 116, consolidate the responsive data received from the indexers 116, and provide the consolidated search results (e.g., to a client device 104 for display to a user).

In some embodiments, the management of indexes 140 is employed based on one or more user specified index settings, such as index names, index maximum sizes, index retention policies, index access policies, and/or the like. In some embodiments, an index name specifies the name of an index 140, and it can be used when referring to the index 140. For example, the user 108 may request to create an index named "Server_Data, the index 140 may be created by the system 102, and the user 108 may be able to refer to the index 140 by name during future processing operations. For example, the user 108 may specify that data from a given source 112 is to be deposited into the index 140 named "Server_Data," the user 108 may specify that a search is to be performed on the data in the index 140 named "Server_Data," the user 108 may request to generate a report on the data in the index 140 named "Server_Data," the user 108 may request to edit one or more index settings for the index named "Server_Data," and/or the like.

A maximum size for an index 140 may specify the maximum amount of data that can be stored in the index 140. In some instances, if data is added to the index 140 and the resulting size of the index 140 exceeds the maximum size, then at least some data may be removed from the index 140. For example, if the user 108 specifies a maximum size of 500,000 gigabytes (GB) for the index 140, the index 140 initially contains 495,000 GB of data, and 10,000 GB of new data is added to the index, then 5,000 GB of data may be removed from the index 140 as a result of adding the 10,000 GB of new data. In some embodiments, the oldest data is removed first. Thus, for example, if the 10,000 GB of new data is to be added to the index 140, then the oldest 5,000 GB of data in the index 140 may be removed from the index 140. In some embodiments, removing data from the index 140 can include deleting the data from the index 140 (e.g., deleting the corresponding data from the one or more raw data files 146 and removing any references to the removed data from the index file 144) and/or archiving the data deleted from the index 140 (e.g., storing the data deleted from the raw data file 146 in an archive so that it can be accessed later if needed). In some embodiments, an entire index 140 can be archived to free additional space. For example, an index file 144 and the corresponding raw data file 146 may be archived.

A retention policy for an index 140 may specify how long data can reside in an index 140 before being removed from the index. A retention policy for an index 140 may specify, for example, that data should be removed from the index 140 if it is older than a threshold age. For example, if a retention policy specifies a retention period of 90 days (e.g., a "time to live" of 90 days), then the data in the index that is more than 90 days old may be removed from the index 140. A retention policy for an index may also specify how data is rolled from one bucket to another. For example, a retention policy may specify that data is stored in a hot data bucket and the data of the hot bucket is rolled into a warm bucket when the data in the hot bucket reaches a specified size and/or the data reaches a specified first age; the data of the warm bucket is rolled into a cold bucket when the data in the warm bucket reaches a specified size and/or the data reaches a specified second age; the data of the cold bucket is rolled into a frozen bucket when the data in the cold bucket reaches a specified size and/or the data reaches a specified third age; and, finally, the data of the frozen bucket is removed (e.g., deleted or archived) when the data in the frozen bucket reaches a specified size and/or the data reaches a specified fourth age.

An access policy for an index 140 may specify who or what entities can access the index 140. An access policy for an index may specify, for example, one or more users (or groups of users) that have permission to access the index 140 and/or one or more users (or groups of users) that do not have permission to access an index 140. For example, if an index access policy grants access to users with "level 3" or greater credentials, then users with "level 3" or "level 4" credentials may be able to access the index 140 (e.g., search the index 140 or edit the index settings for the index 140), whereas users with "level 1" and "level 2" credentials may not be allowed to access the index 140.

In some embodiments, the path of the source data 130 as it passes into and/or through the system 102 can be tracked. In some embodiments, the tracking of the source data 130 can include determining a raw data size associated with one or more portions of the source data 130, tracking what data remains stored on the system 102, and determining an allocated data size that corresponds to the indexed data stored on the system. The allocated data size may be the size of the raw data that corresponds to the indexed data for the account that is stored on the system.

Figure 2:
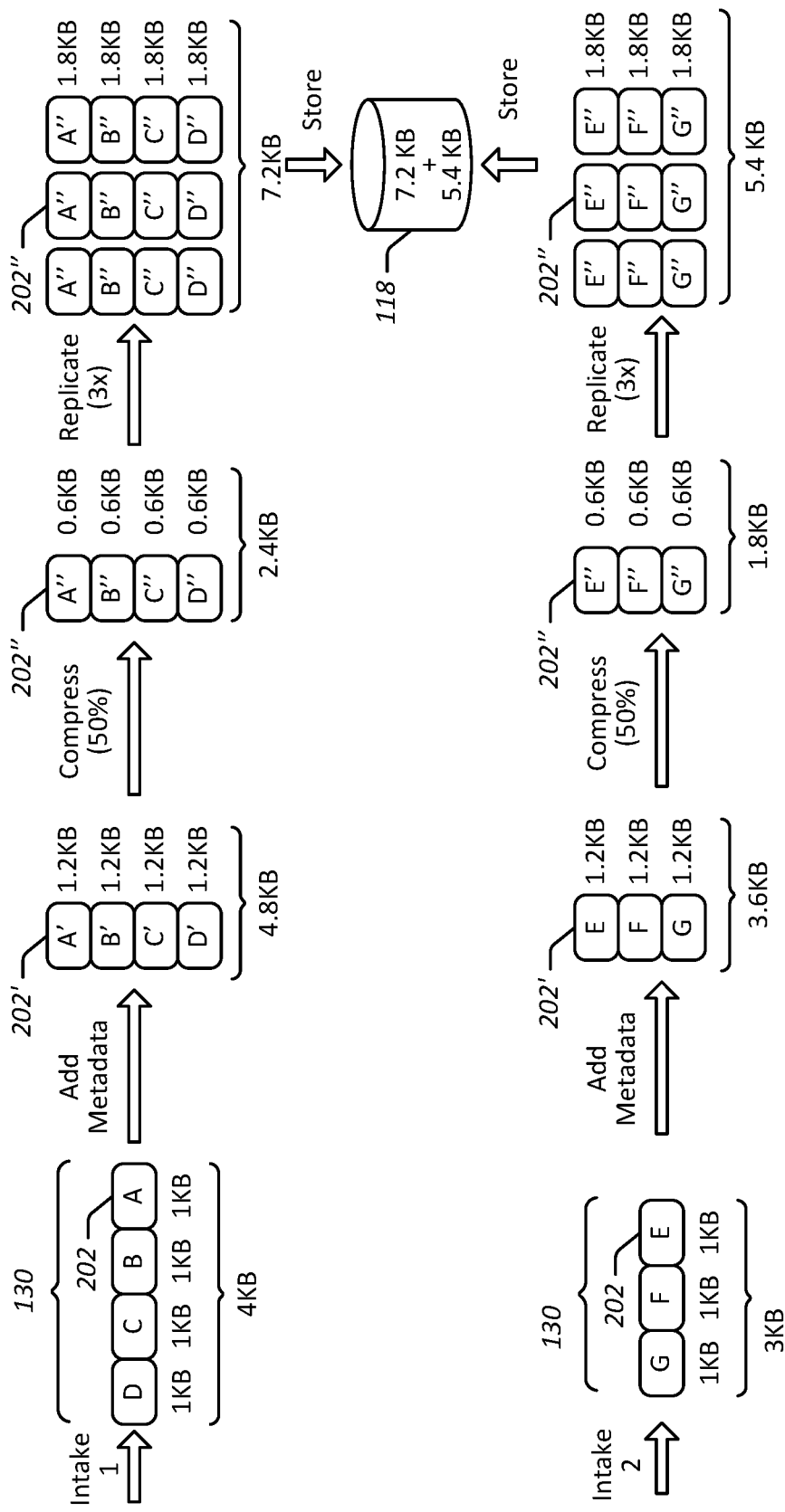
FIG. 2 is a flow diagram that illustrates an example machine data flow in accordance with the disclosed embodiments.

FIG. 2 is a flow diagram that illustrates an example machine data flow 200 in a data processing environment 100 in accordance with the disclosed embodiments. In some embodiments, the source data 130 is received from one or more data sources 112. The source data 130 can be indexed and stored in one or more indexes 140. During indexing, the source data 130 may be subject to various forms of data processing such as event breaking, adding metadata, indexing, compression, replication, and/or the like and, thus, the indexed data may have a storage footprint that is larger or smaller than the size of the corresponding source data 130. In some embodiments, however, an allocated size associated with the stored source data 130 can be determined to be about the same size as the corresponding source data 130, despite the actual storage footprint of the corresponding indexed and stored data being different from the size of the corresponding source data 130. That is, for example, the allocated size can be determined based on the size of the source data 130 at intake, regardless of the actual storage footprint of indexed data that results from processing and/or storing the source data 130.

As illustrated, in some embodiments, the source data 130 can be received by the system 102. The source data 130 may include one or more raw blocks of data 202. For example, the source data 130 may include first, second, third, and fourth raw blocks of data 202, referred to as raw blocks A, B, C, and D, respectively, for simplicity. Each of the raw blocks of data 202 may include an identifiable unit of data, such that its path through the system 102 can be tracked. Each raw block of data 202 may have or otherwise be associated with a given data size. This may be referred to as the "intake size" of the data (e.g., the size of the source data 130 before it is subjected to processing by the system 102). If a raw block of data 202 is a block of raw source data 130 taken in by a forwarder 114 from a source 112, the intake size may be defined as the size of the source data 130 at the intake by the forwarder 114. Continuing with the above example, each of the raw blocks A, B, C, and D may have an individual intake size of about 1 KB, and a total intake size of about 4 KB for the set of source data 130 (e.g., the total size for the raw blocks A, B, C, and D together).

Once taken in, the raw blocks of data 202 may be subjected to indexing. This can include adding metadata, compression, replication, and/or other forms of processing. The processing and storage may create a storage footprint for the raw blocks of data 202 that is larger or smaller than the intake size(s) of the raw blocks of data 202. For example, during an indexing segment, the raw blocks of data 202 may be subject to the addition of metadata, compression, and/or replication that each increases or decreases the size of the data.

Continuing with the above example, metadata may be added to the raw blocks A, B, C, and D. For example, an indexer 116 may add a source value to each of the events of the raw blocks A, B, C, and D. If the addition of the source values adds about 0.2 KB to each of the raw blocks A, B, C, and D, then the addition of the data to the raw blocks A, B, C, and D may result in the generation of processed blocks of data 202', referred to as blocks A', B', C', and D', each having an individual processed size of about 1.2 KB (e.g., 1.2 KB=1 KB+0.2 KB), and the processed blocks A', B', C', and D' may have a total size of about 4.8 KB (e.g., the total size of the blocks A', B', C', and D' together). Thus, each of the blocks A', B', C', and D' may have an individual storage footprint of about 1.2 KB, and a total storage footprint of about 4.8 KB.

Continuing with the above example, the processed blocks A', B', C', and D' may be compressed. For example, an indexer 116 may store compressed versions of the processed blocks A", B", C" and D", in a compressed raw data file 146 of a first index 140. If, for example, the compression provides a 50% reduction of the size of the data in the processed blocks, each of the processed blocks A", B", C", and D" may have an individual processed size of about 0.6 KB, and the blocks A", B", C", and D" may have a total size of about 2.4 KB (e.g., the total size of the blocks A", B", C", and D" together). Thus, each of the blocks A", B", C", and D" may have an individual storage footprint of about 0.6 KB, and a total storage footprint of about 2.4 KB.

Continuing with the above example, the raw data file 146 may be replicated, resulting in storage of additional copies of the raw data file 146 and the blocks A", B", C", and D". For example, in a 3× replication, a cluster master may cause two additional indexers 116 to each store a copy of the raw data file 146 in their databases, such that three copies of the raw data file 146 are maintained by the system 102. Thus, a total of three copies of each of the blocks A", B", C", and D" may be stored on the system 102 by way of the replicated raw data files 146. Thus, each of the copies of the processed blocks A", B", C", and D" may be associated with a processed size of about 1.8 KB, and all of the copies of the blocks A", B", C". and D" may have a total size of about 7.2 KB (e.g., the total size of all of the copies of the blocks A", B", C", and D" together). Thus, each of the blocks A", B", C", and D" may be associated with an individual storage footprint of about 1.8 KB, and a total storage footprint of about 7.2 KB together. Accordingly, the processed data may be associated with a stored size, or storage footprint, of about 7.2 KB despite the corresponding source data 130 having a size of about 4 KB.

As discussed herein, an allocated size of the data may correspond to the size of the source data 130, without regard to the actual storage footprint. In instances where customers pay a fee for an amount of data stored or processed, this may enable a user to determine whether his/her allocated usage is at, near, above, or below the amount of data the customer has paid for without having to worry about the effects of back-end processing on the size of his/her data. That is, using the size of the data taken in as the allocated data may provide a simple way to track data usage, without having to introduce the complexity of tracking storage footprint changes as a result of back-end processing. In the above described example, the allocated data size for the user's account may be determined to be about 4 KB, despite the actual storage footprint being about 7.2 KB.

In some embodiments, an amount of allocated data can be adjusted as additional data is added or removed from the system 102. For example, if an additional source data 130 is taken in, then the allocated data size may be increased by the size of the source data 130 taken in. Continuing with the above example, if additional source data 130 including three additional blocks of data 102, blocks E, F, and G that are about 1 KB in size is taken in and subject to similar processing, then the allocated data size may increase to about 7 KB, and the storage footprint may increase to about 12.6 KB (e.g., the total size of all of the copies of the blocks A", B", C", and D" (about 7.2 KB), and all three copies of the resulting blocks E", F", and G" (about 5.4 KB)). As a further example, if a portion of the stored data is deleted, then the allocated data size may be decreased by the size of the source data 130 that corresponds to the deleted data. Continuing with the above example, if all of the copies of the blocks A" and B" are deleted, but none of the copies of blocks C", D", E", F", and G" are deleted, then the allocated data size may decrease to about 5 KB, and the storage footprint may decrease to about 9.0 KB (e.g., the total size of the three copies of the blocks C", D", E", F", and G").

In some embodiments, an amount of allocated data can be associated with a given location, such as an index 140. For example, continuing with the above example, if each of the blocks A", B", C", and D" are stored in a raw data file 146 on a first index 140, and each of the blocks E", F", and G" are stored in a raw data file 146 on a second index 140, then the first index 140 may be associated with an allocated data size of about 4 KB and a storage footprint of about 7.2 KB, and the second index 140 may be associated with an allocated data size of about 3 KB and an actual storage footprint of about 5.4 KB.

In some embodiments, an interactive graphical user interface (GUI) can be provided to communicate to a user how data is allocated. For example, if the user 108 has purchased a given amount of storage from the provider of system 102, it may be useful to know how much of that storage has been used (also referred to as "allocated"), how it is allocated between different indexes, and/or how much unused (also referred to as "unallocated") space remains. If for example, a user purchases 1,000 GB of storage space and has created four indexes 140 that are used to store indexed data corresponding to the source data 130 provided by one or more of his/her sources 112, then it may be helpful to indicate to the user 108 how much of the 1,000 GB has been allocated, how much data is allocated to each of the four indexes 140, how much of the 1,000 GB is unallocated, and/or the like. In some instances, it may be further helpful to warn the user 108 if the allocated amount is at, near, or above the amount the user has purchased. That is, the system 102 may provide a warning and/or indicator if the allocated data is close to or has already exceeded a maximum data limit, such as the amount of storage purchased, or a percentage thereof.

Figure 3:
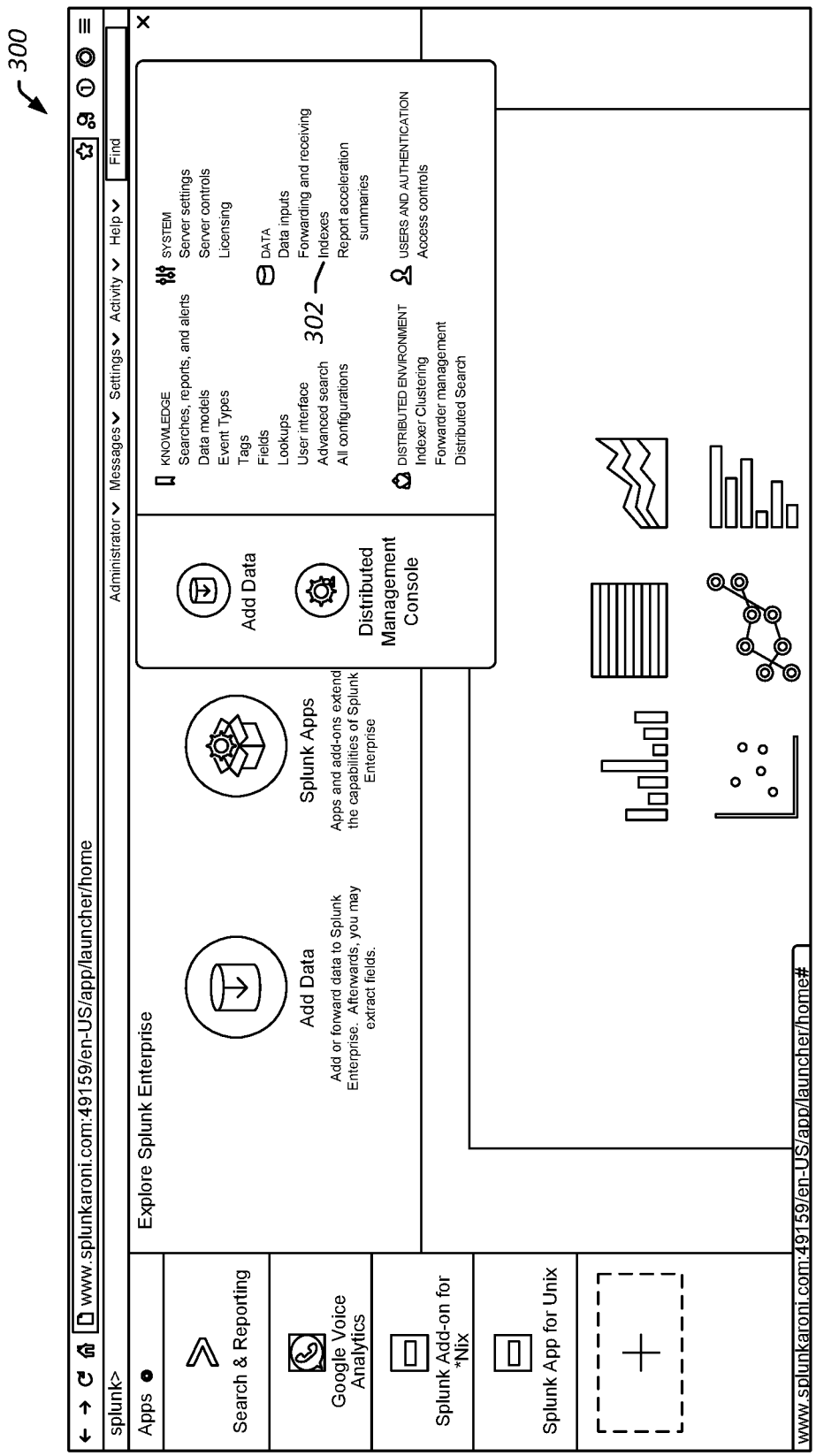
FIG. 3 illustrates an example application management home page graphical user interface (GUI) in accordance with the disclosed embodiments.

FIG. 3 illustrates an example application management home page GUI 300 in accordance with the disclosed embodiments. The application management home page GUI 300 may be displayed, for example, as a result of the user 108 logging into his/her account with the system 102. In some embodiments, the application management home page GUI 300 includes a menu selection for "Settings" that, when selected, provides a drop-down menu displaying links for navigating to various destinations. The links may include an "Indexes" link 302. Upon selection of the indexes link 302, an index management overview GUI may be displayed.

Figure 4:
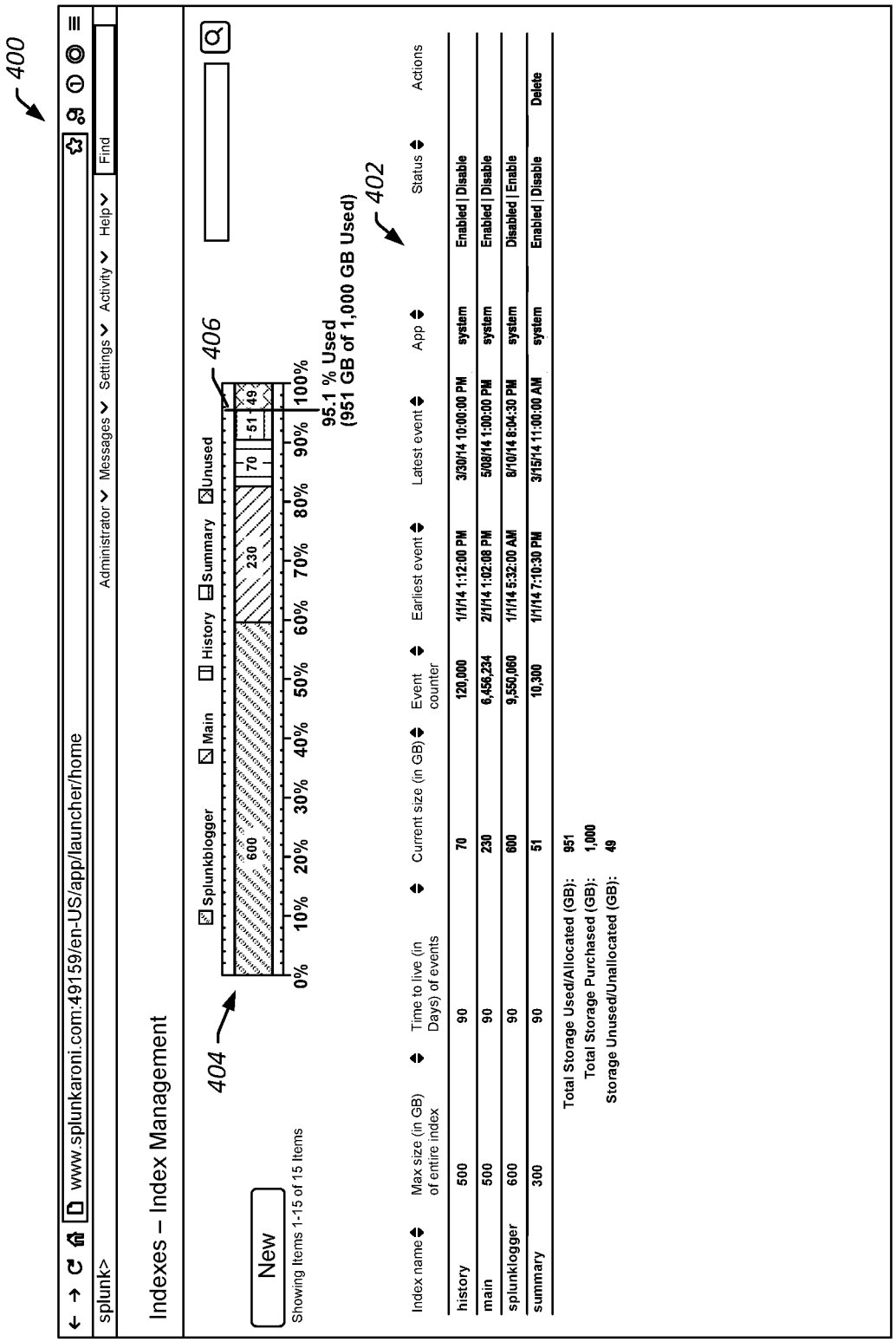
FIG. 4 illustrates an example index management overview GUI in accordance with the disclosed embodiments.

FIG. 4 illustrates an example index management overview GUI ("overview GUI") 400 in accordance with the disclosed embodiments. As illustrated, the index management overview GUI 400 may include a table of indexes 402. Each row of the table of indexes 402 may correspond to an existing index 140. In some embodiments, the table of indexes 402 may list some or all of the existing indexes, including internal and external indexes 140. In some embodiments, the table of indexes 402 may list a subset of the existing indexes including, for example, only external indexes 140 and hiding internal indexes 140. For example, as depicted in FIG. 4, the table of indexes 402 may include a listing of external indexes (e.g., showing rows for "history," "main," "splunkblogger," and "summary" indexes 140), but may hide internal indexes (e.g., not showing a row for an internal index 140 for auditing or rows for other internal indexes 140). In some embodiments, the table of indexes 402 may only display indexes 140 that can contain data that counts toward the allocated data associated with the user's account. For example, the data in the "history," "main," "splunkblogger," and "summary" indexes 140 may count toward the allocated data for the account associated with the user 108, whereas the data in the "_audit," "_block-signature" indexes 140 (not shown) may not count toward the allocated data for the account associated with the user 108

As illustrated, in some embodiments, each row of the table of indexes 402 may include a column for each of an index name, an index maximum size, an index retention policy (e.g., "Time to live (in Days) of events), a current size, an event count, an earliest event, a latest event, an application ("app"), a status, and available actions ("actions"). The index name may indicate the name assigned to the index (e.g., "history"). In some embodiments, the displayed name of an index may include a user selectable link to navigate to an index editing interface (e.g., an interactive GUI for editing and applying index settings). The index maximum size may indicate the current maximum size specified for the index 140 (e.g., 500 gigabytes (GB)). The index retention policy may indicate the current retention policy for the index 140 (e.g., a "time to live" of 90 days). The current size may correspond to the amount of data currently stored in the index 140 (e.g., 70 GB). The event count may indicate the number of events for which data is currently stored in the index 140 (e.g., 120,000). The earliest event may indicate the date and time of the earliest (or oldest) event for which data is currently stored in the index 140 (e.g., Jan. 1, 2014; 1:12:00 PM). The latest event may indicate the date and time of the latest (or newest) event for which data is currently stored in the index 140 (e.g., Mar. 30, 2014; 10:00:00 PM). The application may indicate an application associated with the index 140 (e.g., system). The status may indicate whether the index 140 is currently enabled or disabled. In some embodiments, the status may include an enable and/or disable link, and clicking on the enable or disable link may result in performing a respective enabling or disabling of the index 140. The actions may indicate actions currently available for the index 140 from the index management overview GUI 400 (e.g., delete). In some embodiments, the index management overview GUI 400 can include a "New" button that is a user selectable link to navigate to an index creation interface (e.g., an interactive GUI for creating a new index, including defining and applying index settings for the new index).

The index management overview GUI 400 may include one or more elements, such as the table of indexes 402 and/or a storage bar 404, that indicate information about storage usage (e.g., allocated storage) for an account. The table of indexes 402 and/or a storage bar 404 may provide an indication of the total storage capacity purchased (e.g., how storage space has been purchased for the account), an aggregate of the storage consumption (e.g., how much of the purchased storage space is being used to store data), the storage consumption by the different indexes (e.g., how much data is stored in the various indexes associated with the account), and the storage availability (e.g., how much of the purchased storage space is not being consumed by the storage of data, and is available for the storage of additional data).

With regard to the table of indexes 402, for example, the "current size" column of the table of indexes 402 may include a listing of the amount of data consumed by each of the respective indexes (e.g., 70 GB consumed by the "history" index, 230 GB consumed by the "main" index, 600 GB consumed by the "splunkblogger" index, and 51 GB consumed by the "summary" index). The table of indexes 402 may also include elements that indicate an aggregate of the storage consumption (e.g., Total Current Used/Allocated Storage (GB)=951), the total storage capacity purchased (e.g., Total Storage Purchased (GB)=1000), and the storage availability (e.g., Storage Unused/Unallocated (GB)=49). In some embodiments, the index management overview GUI 400 may provide various elements for creating, editing or otherwise managing indexes, such as that described in U.S. patent application Ser. No. 14/610,704 titled "SYSTEMS AND METHODS FOR MANAGING DATA INDEXES" and filed on Jan. 30, 2015, which is hereby incorporated by reference.

With regard to the storage bar 404, for example, the graphic may include an indication of the total storage capacity purchased, an aggregate of the storage consumption, the amount of data consumed by each of the respective indexes, and the storage availability (e.g., unused storage capacity). For example, the total length of the bar chart (e.g., 0%-100%) may correspond to the 1,000 GB of purchased storage capacity. The storage bar 404 may include stacked horizontal bar segments corresponding to "splunkblogger," "main," "history," and "summary" indexes, as well as the unused storage capacity. The stacked bar segment may each have a relative size/length that corresponds to the storage consumed by each of the indexes. For example, the stacked segment corresponding to "splunkblogger" may have a size/length that is about 60% of the total length of the bar, the stacked segment corresponding to "main" may have a size/length that is about 23% of the total length of the bar, the stacked segment corresponding to "history" may have a size/length that is about 7% of the total length of the bar, the stacked segment corresponding to "summary" may have a size/length that is about 5.1% of the total length of the bar, and the stacked segment corresponding to "unused" storage space (e.g., purchased storage space not allocated to data stored in an index) may have a size/length that is about 4.9% of the total length of the bar. Each of the segments may include an annotation that indicates the amount of data corresponding thereto. For example, the first four stacked horizontal bar segments corresponding to the "splunkblogger," "main," "history," and "summary" indexes may include the annotations of "600," "230," "70," and "51," and the stacked horizontal bar segment for "unused" may include the annotation "49." An allocation line 406 (e.g., at the end of the stacked bar segments corresponding to used storage space) may include the annotation "95.1% Used" and "951 GB of 1,000 GB Used," indicating the total purchased storage amount and the amount of storage consumed.

In some embodiments, an indication of the amount of available storage (e.g., 49 GB) may be displayed in an index editing and/or creation interface (e.g., an interactive GUI for editing and/or creating a new index). Such an indication may enable the user 108 to determine how much unused storage capacity is available when defining index settings for an index, such as maximum index size. FIGS. 5A and 5B illustrate example index editing and index creation GUIs 500a and 500b, respectively, in accordance with the disclosed embodiments. Each of the GUIs 500a and 500b include a storage availability element 502 indicating the current amount of unused or available storage space (e.g., 49 GB).

Figure 6:
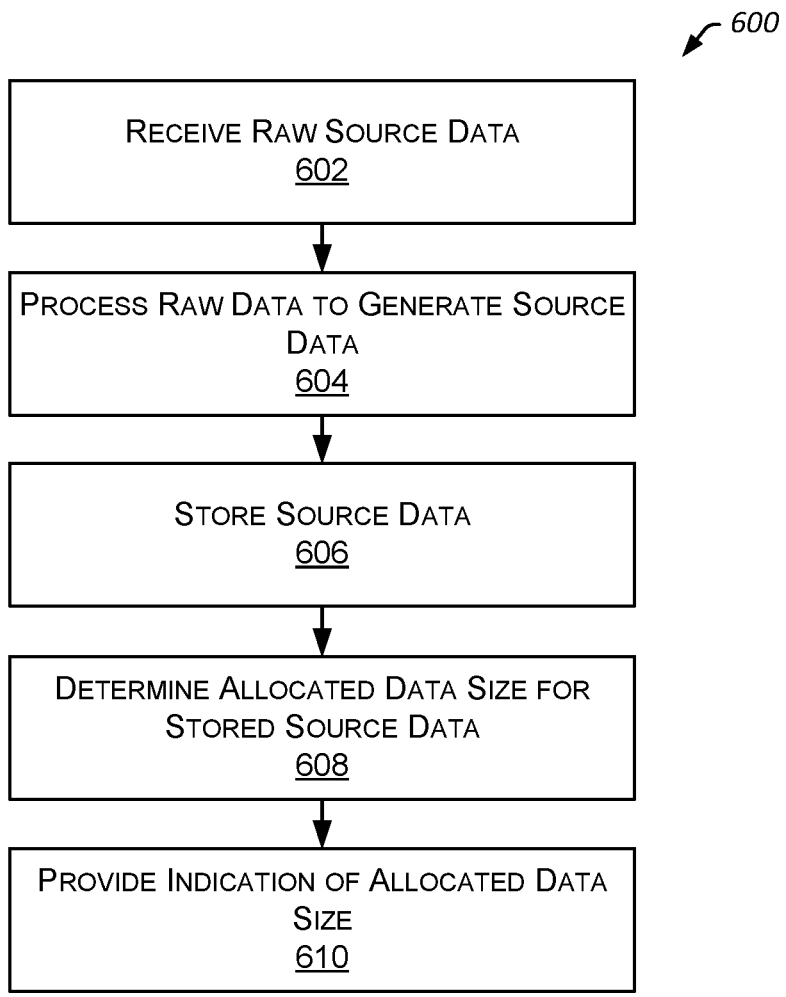
FIG. 6 is a flowchart that illustrates an example method for managing data storage in accordance with the disclosed embodiments.

FIG. 6 is a flowchart that illustrates an example method 600 for managing data storage in accordance with the disclosed embodiments. Method 600 may generally include receiving raw source data (block 602), processing the raw data to generate source data (block 604), storing the source data (block 606), determining an allocated data size for the stored source data (bock 608), and providing an indication of the allocated data size (block 610). Some or all of the operations of method 600 may be performed by the index management module 150 and/or one or more entities of the system 102.

In some embodiments, receiving raw source data (block 602) can include receiving raw source data 130 from one or more sources 112. For example, a forwarder 114 may receive raw source data 130 from one or more sources 112, such as a server. In some embodiments, the raw source data 130 can include machine data. For example, the raw source data 130 may include a first stream of server log data from a first source 112, such as a first server, and a second stream of server log data from a second source 112, such as a second server. In an example embodiment, the first stream of server log data may include four raw blocks of data 202, raw blocks A, B, C, and D. The second stream of server log data may include three raw blocks of data 202, raw blocks E, F and G. Each of the raw blocks A, B, C, D, E, F, and G may have a size of about 1 KB.

In some embodiments, processing the raw data to generate source data (block 604) can include conducting one or more forms of processing, such as metadata addition, compression, replication, and/or the like. Continuing with the above example, an indexer 116 may add a source value to each of the events of the raw blocks A, B, C, D, E, F, and G. If the addition of the source values adds about 0.2 KB to each of the raw blocks A, B, C, D, E, F, and G, then the addition of the data to the blocks A, B, C, D, E, F, and G may result in the generation of processed blocks of data 202', referred to as blocks A', B', C', D', E' F', and G', each having an individual processed size of about 1.2 KB (e.g., 1.2 KB=1 KB+0.2 KB), and the processed blocks A', B', C', D', E', F', and G' may have a total size of about 8.4 KB (e.g., the total size of the blocks A', B', C', D', E', F', and G' together). Thus, each of the blocks A', B', C', D', E', F', and G' may have an individual storage footprint of about 1.2 KB, and the blocks may together have a total storage footprint of about 8.4 KB.

Continuing with the above example, the processed blocks A', B', C', D', E' F', and G' may be compressed. If, for example, the compression provides a 50% reduction of the size of the data in the processed blocks, each of the processed blocks A", B", C", D", E" F", and G" may have an individual processed size of about 0.6 KB (e.g., 0.6 KB=1.2 KB×0.5), and the blocks A", B", C", D", E" F", and G" may have a total size of about 4.2 KB (e.g., the total size of the blocks A", B", C", D", E" F", and G" together). Thus, each of the blocks A", B", C", D", E" F", and G" may have an individual storage footprint of about 0.6 KB, and the blocks may together have a total storage footprint of about 4.2 KB.

Continuing with the above example, the processed blocks A", B", C", and D" may be added to a first raw data file 146, the processed blocks E" F", and G" may be added to a second raw data file 146, and the raw data files 146 may be replicated, resulting in storage of additional copies of the raw data files 146 and the blocks A", B", C", D", E" F", and G". For example, a cluster master may cause two additional indexers 116 to each store a copy of the first and second raw data files 146 in their databases, such that three copies of the first and second raw data files 146 are stored by the system 102. Thus, a total of three copies of each of the blocks A", B", C", D", E" F", and G" may be stored on the system 102 by way of the replicated raw data files 146. Thus, each of the copies of the processed blocks A", B", C", D", E" F", and G" may be associated with a processed size of about 1.8 KB, and all of the copies of the blocks A", B", C", D", E", F", and G" may have a total size of about 11 KB (e.g., the total size of all of the copies of the blocks A", B", C", D", E" F", and G" together). Thus, each of the blocks A", B", C", D", E" F", and G" may be associated with an individual storage footprint of about 1.8 KB, and the blocks may together have a total storage footprint of about 12.6 KB. Accordingly, the processed data may be associated with a stored size, or storage footprint, of about 12.6 KB despite the corresponding raw source data 130 having a size of about 7 KB.

In some embodiments, storing the source data (block 606) can include storing the source data 130 in one or more indexes 140. Continuing with the above example, a first indexer 116 may index the blocks A", B", C", and D" in a first index 140, including generating a first raw data file 146 that includes the blocks A", B", C", and D", and the first raw data file 146 may be stored in a bucket 142 of the first index 140, in the data store 118 for the first index 140. Further, a second indexer 116 may index the blocks E", F", and G" into a second index 140, including generating a second raw data file 146 that includes the blocks E", F", and G", and the second raw data file 146 may be stored in a bucket 142 of the second index 140, in the data store 118 for the second index 140.

In some embodiments, determining an allocated data size for the stored source data (block 608) can include determining a size of the raw machine data (e.g., source data 130) corresponding to the processed machine data stored in the data store. In some embodiments, the index management module 150 tracks data as it passes through the system 102, determining the size of the corresponding raw source data 130, and whether or not the data (or a corresponding representation thereof) is still stored by the system 102, or if the data (or any corresponding representation thereof) has been removed from (e.g., deleted from) the system 102. If data (or any corresponding representation thereof) is still stored by the system 102, then the size of the corresponding raw source data 130 may be determined as part of an allocated size. Thus, if three copies of a block of a 1 KB piece of raw source data 130 are stored by the system 102, then an allocated size of 1 KB is attributed to the stored data, despite the fact that the three copies actually take up 3 KB of storage space in the data stores 118 of the system 102. This can be repeated for all of the incoming portions of raw machine data (e.g., source data 130). For example, if 1 MB (megabyte) of blocks of raw source data 130 has been taken for an account associated with the user 108, and three copies are maintained, then the allocated size of 1 MB may be associated with the account, despite the fact that the data for the account actually takes up 3 MB of storage space in the data stores 118 of the system 102.

Continuing with the above example, if blocks A, B, C, D, E, F, and G are all that has been taken in for the account associated with the user 108, then the allocated data size for the account may be determined to be about 7 KB, despite the actual storage footprint being about 12.6 KB.

In some embodiments, the allocated data size can be determined for different storage locations, such as for different indexes. For example, if the blocks A", B", C", and D" are the only blocks indexed in the first index 140 (e.g., in the first raw data file 146), then it can be determined that the first index 140 has an allocation of about 4 KB (e.g., based on the size of the corresponding source data 130, blocks A, B, C, and D), and despite its storage footprint of about 7.2 KB. Similarly, if the blocks E", F", and G" are the only blocks indexed in the second index 140 (e.g., in the second raw data file 146), then it can be determined that the second index 140 has an allocation of about 3 KB (e.g., based on the size of the corresponding source data 130, blocks E, F and G), and despite its storage footprint of about 5.4 KB.

In some embodiments, an amount of allocated data can be adjusted as additional data is added or removed from the system 102. For example, if an additional source data 130 is taken in, then the allocated data size may be increased by the size of the source data 130 taken in. Continuing with the above example, if additional source data 130 including three additional blocks of data 202, blocks H, I, and J that are each about 1 KB in size are taken in, and subject to similar processing to add them to the first index, then the total allocated data size for the account may increase to about 10 KB, the allocated data size for the first index may increase to about 7 KB, the total storage footprint for the account may increase to about 18 KB (e.g., the total size of all three copies of the blocks A", B", C", D", E", F", G", H", I", and J"), and the storage footprint for the first index 140 may increase to about 12.6 KB (e.g., the total size of all three copies of the blocks A", B", C", D", H", I", and J").

As a further example, if a portion of the stored data is deleted, then the allocated data size may be decreased by the size of the source data 130 that corresponds to the deleted data. Continuing with the above example, if all of the copies of the blocks A" and B" are deleted, but none of the copies of the blocks C", D", E", F", G", H", I", and J" are deleted, then the total allocated data size for the account may decrease to about 8 KB, the allocated data size for the first index may decrease to about 5 KB, the total storage footprint for the account may decrease to about 14.4 KB (e.g., the total size of all of the three copies of the blocks C", D", E", F", G", H", I", and J"), and the storage footprint for the first index 140 may decrease to about 9 KB (e.g., the total size of all of the three copies of the blocks C", D", H", I" and J").

In some embodiments, providing an indication of the allocated data size (block 610) can include providing an indication of a total storage capacity purchased (e.g., how much storage space has been purchased for an account), an aggregate of the storage consumption (e.g., how much of the purchased storage space is being used to store data), the storage consumption by the different indexes (e.g., how much data is stored in the various indexes associated with the account), and the storage availability (e.g., how much of the purchased storage space is not being consumed by the storage of data, and is available for the storage of additional data). For example, the index management module 150 may serve, to a client device 104 associated with the user 108, index management GUI content 156 that can be displayed by the client device 104. The index management GUI content 156 may include an index management overview GUI that is the same or similar to the GUI 400 of FIG. 4. In some embodiments, an indication of the allocated data size can be presented by the GUI. For example, the index management GUI content 156 may include an index editing GUI that is the same or similar to the GUI 500a of FIG. 5A, or an index creation GUI that is the same or similar to the GUI 500b of FIG. 5B. Continuing with the above example, an index management overview GUI may indicate 1 GB of total storage capacity purchased, 8 KB of aggregate storage consumption, and 5 KB of storage consumed by (or allocated to) the first index 140, 3 KB of storage consumed by (or allocated to) the second index 140, and 999,992 KB of available storage (or unallocated storage).

In some embodiments, one or more predetermined actions can be taken in response to determining that the allocated data is above a threshold amount. For example, a first approaching limit warning and/or indicator may be provided when the allocated data reaches about 85% of the purchased amount, a second approaching limit warning and/or indicator may be provided when the allocated data reaches about 90% of the purchased amount, and an over limit warning and/or indicator may be provided when the allocated data is at or above the purchased amount. The message may be displayed in an index management GUI for the account (e.g., in an index management overview GUI that is the same or similar to the GUI 400 of FIG. 4), or may be provided by another conduit, such as an electronic message, a text message, and/or the like to the user 108. In some embodiments, other actions can be taken when the allocated data is at or above the purchased amount. For example, in response to determining that the allocated data is at or above the purchased amount, the system 102 may delete at least some of the data from the indexes 140, inhibit access to the indexes 140, inhibit intake of additional raw machine data (e.g., source data 130), inhibit processing of additional raw machine data, charge an overage fee, automatically increase the subscription to purchase a larger amount of storage capacity, and/or the like. In some embodiments, the determined amount of allocated storage can be used to determine a fee or cost, such a fee to be charged for the use of the allocated storage.

Figure 7:
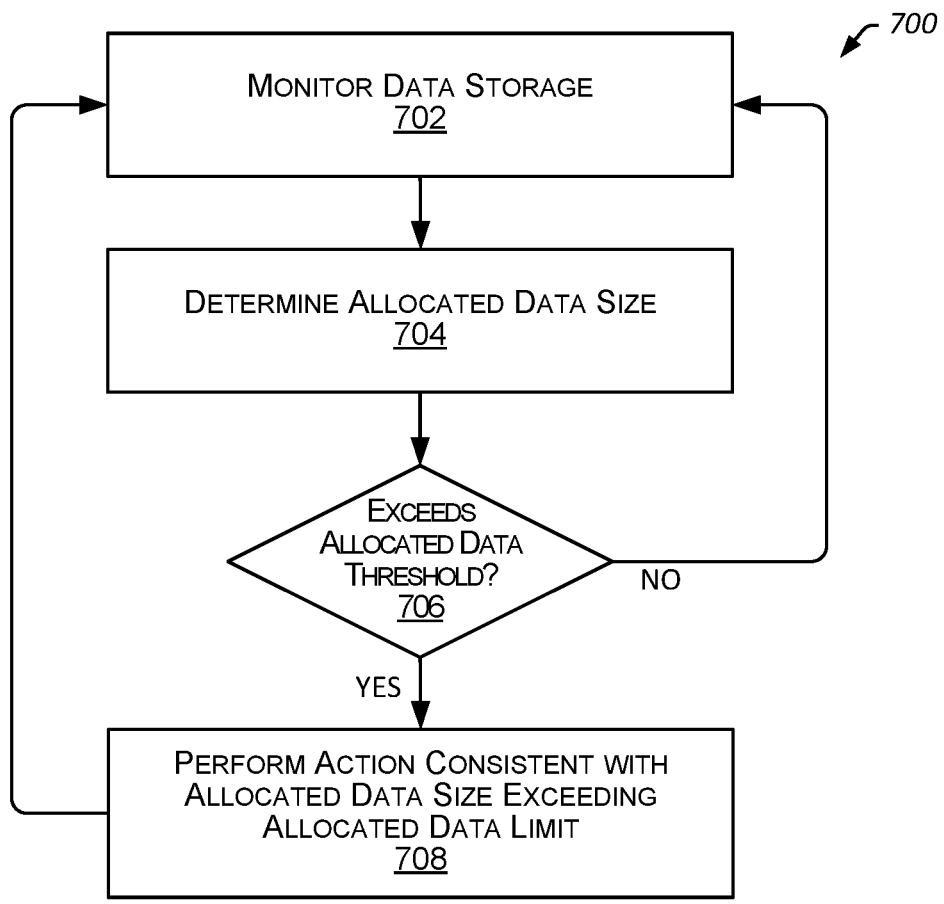
FIG. 7 is a flowchart that illustrates an example method for monitoring data storage usage in accordance with the disclosed embodiments.

FIG. 7 is a flowchart that illustrates an example method 700 for monitoring data storage usage in accordance with the disclosed embodiments. Method 700 may generally include monitoring data storage (block 702), determining an allocated data size (block 704), determining whether the allocated data size exceeds an allocated data threshold (block 706), and performing an action consistent with the allocated data size exceeding an allocated data threshold (block 708) (e.g., in response to determining that the allocated data size exceeds an allocated data threshold). Some or all of the operations of method 700 may be performed by the index management module 150 and/or one or more entities of system 102.

In some embodiments, monitoring data storage (block 702) can include tracking data inputs and data outputs to determine what data is currently stored. For example, the index management module 150 may track raw source data 130 that is received, determine a size associated with the raw source data 130 received, track processed source data that is stored in memory, and track processed source data that is removed from memory. Referring to the above example, monitoring data storage may include the index management module 150 tracking the intake of each of blocks A, B, C, D, E, F, G, H, I, and J, and associating an intake size of 1 KB with each of the blocks A, B, C, D, E, F, G, H, I, and J. Further, monitoring data storage may include the index management module 150 tracking the storage and/or removal of the blocks A", B", C", D", E", F", G", H", I", and J", corresponding to blocks A, B, C, D, E, F, G, H, I, and J, respectively. For example, monitoring data storage may include the index management module 150 tracking the storage of blocks A", B", C", D", E", F", G", H", I", and J", and the subsequent deletion of the blocks A" and B".

In some embodiments, determining an allocated data size (block 704) can include determining an allocated data size for the data currently stored. For example, the index management module 150 may determine an allocated data size that is the total of the raw data sizes associated with the data currently stored. Referring to the above example, if monitoring of the data storage determines that the blocks A", B", C", D", E", F", and G" are currently indexed and stored in memory (e.g., including a total of three copies of each of the blocks A", B", C", D", E", F", and G" based on a 3× replication), then determining an allocated data size may include the index management module 150 determining a data size of about 7 KB (e.g., the total raw data size of the blocks A, B, C, D, E, F, and G corresponding to the stored blocks A", B", C", D", E", F", and G"). Thus, if blocks A, B, C, D, E, F, and G are all that has been taken in for the account associated with the user 108, then the allocated data size for the account may be determined to be about 7 KB, despite the actual storage footprint being about 12.6 KB.

Continuing with the above example, if monitoring of the data storage determines that additional blocks H", I", and J" have also been indexed and stored, such that the blocks A", B", C", D", E", F", G", H", I", and J" are currently stored in memory (e.g., including a total of three copies of each of the blocks A", B", C", D", E", F", G", H", I", and J" based on a 3× replication), then determining an allocated data size may include the index management module 150 determining a data size of 10 KB (e.g., the total raw data size of the blocks A, B, C, D, E, F, G, H, I, and J corresponding to the stored blocks A", B", C", D", E", F", G", H", I", and J"). Thus, if blocks A, B, C, D, E, F, G, H, I, and J are all that has been taken in for the account associated with the user 108, then the allocated data size for the account may be determined to be about 10 KB, despite the actual storage footprint being about 18 KB.

Continuing with the above example, if monitoring of the data storage determines that blocks A" and B" have been deleted from storage, such that the blocks C", D", E", F", G", H", I", and J" are currently stored in memory (e.g., including a total of three copies of each of the blocks C", D", E", F", G", H", I", and J" based on a 3× replication), then determining an allocated data size may include the index management module 150 determining a data size of 7 KB (e.g., the total raw data size of the blocks C, D, E, F, G, H, I, and J corresponding to the stored blocks C", D", E", F", G", H", I", and J"). Thus, if blocks C, D, E, F, G, H, I, and J are all that remains indexed and stored for the account associated with the user 108, then the allocated data size for the account may be determined to be about 8 KB, despite the actual storage footprint being about 14.4 KB.

In some embodiments, determining whether the allocated data size exceeds an allocated data threshold (block 706) can include comparing the allocated data size to one or more threshold limits. For example, the index management module 150 may identify or otherwise determine one or more allocated data thresholds, and compare the allocated data size to the one or more allocated data thresholds to determine whether the allocated data size exceeds any of the one or more allocated data thresholds. For example, if the user 108 has purchased 1,000 GB of storage, and the index management module 150 identifies that a first data limit warning and/or indicator is set at 85% of the purchased storage, a second data limit warning and/or indicator is set at 90% of the purchased storage, and a maximum data threshold is set at 100% of the purchased storage, then the index management module 150 may determine respective data limit thresholds including, for example, a first data limit threshold (e.g., an 85% usage threshold) of 850 GB, a second data limit threshold (e.g., a 90% usage threshold) of 900 GB, and a third data limit threshold (e.g., a maximum usage threshold or maximum data limit) of 1,000 GB. If for example, an allocated data size of 500 GB for the account is determined, then it can be determined that the current allocated data size does not exceed any of the one or more allocated data thresholds. If for example, an allocated data size of 875 GB for the account is determined, then it can be determined that the current allocated data size exceeds the 85% usage threshold (e.g., exceeds 850 GB). If for example, an allocated data size of 950 GB for the account is determined, then it can be determined that the current allocated data size exceeds the 90% usage threshold (e.g., exceeds 900 GB). If for example, an allocated data size of 1,001 GB for the account is determined, then it can be determined that the current allocated data size exceeds the maximum usage threshold (e.g., exceeds 1,000 GB).

In some embodiments, performing an action consistent with the allocated data size exceeding an allocated data threshold (block 708) can include performing one or more actions in response to determining that an allocated data size exceeds at least one of the allocated data thresholds. For example, in response to determining that an allocated data size exceeds at least one of the allocated data thresholds, the index management module 150 may take or cause one or more of the following actions: provide an indication of the allocated data size exceeding at least one of the allocated data thresholds, delete at least some of the stored data, inhibit access to data, inhibit intake of additional data, inhibit processing of data, charge a fee, increase available storage, and/or the like. In some embodiments, the determined amount of allocated storage can be used to determine a fee or cost, such a fee to be charged for the use of the allocated storage.

In some embodiments, providing an indication of the allocated data size exceeding at least one of the allocated data thresholds, can include sending an electronic message, such as an e-mail message indicating that the allocated data size exceeds at least one of the allocated data thresholds. For example, if it is determined that the current allocated data size for an account associated with the user 108 is 875 GB and thus exceeds the 85% usage threshold of 850 GB, then the index management module 150 may send an e-mail message (or text message) to an e-mail account (or phone number) for the user 108. Such a message may state, for example, "WARNING—The current data storage of 875 MB for your account has exceeded 85% of your purchased storage capacity of 1,000 GB." As a further example, if it is determined that the current allocated data size for an account associated with the user 108 is 950 GB and thus exceeds the 90% usage threshold of 900 GB, then the index management module 150 may send an e-mail message (or text message) to the e-mail account (or phone number) for the user 108. Such a message may state, for example, "WARNING—The current data storage of 950 MB for your account has exceeded 90% of your purchased storage capacity of 1,000 GB." As yet another example, if it is determined that the current allocated data size for an account associated with the user 108 is 1,001 GB, and thus exceeds the maximum usage threshold of 1,000 GB, then the index management module 150 may send an e-mail message (or text message) to the e-mail account (or phone number) for the user 108. Such a message may state, for example, "WARNING—The current data usage for your account has exceeded your purchased storage capacity of 1,000 GB." Such messages can include relevant account overview information (e.g., the same or similar to that presented in the index management overview GUI 400 of FIG. 4), a link that is user selectable to navigate to an index management overview content page (e.g., a link to a webpage including an index management overview GUI similar to that of overview GUI 400 of FIG. 4), a link to a network content page for increasing the storage capacity for the account (e.g., a link to a webpage for purchasing more storage for the account), and/or the like.

In some embodiments, deleting at least some of the stored data can include deleting some or all of the stored data to reduce the amount of stored data. For example, if it is determined that the current allocated data size for an account associated with the user 108 is 1,001 GB and thus exceeds the maximum usage threshold of 1,000 GB by 1 GB, then the index management module 150 may delete at least 1 GB of the oldest data from one or more of the indexes 140 for the account.

In some embodiments, inhibiting access to data can include limiting a user's ability to access some or all of the stored data associated with an account to encourage the user to delete some of the stored data and/or purchase additional storage capacity. For example, if it is determined that the current allocated data size for an account associated with the user 108 is 1,001 GB, and thus exceeds the maximum usage threshold of 1,000 GB, then the index management module 150 may prevent the user 108 from searching the indexes 140 associated with the account. Once the current allocated data size is within the maximum usage threshold, then the index management module 150 may again allow the user 108 to search the indexes 140 associated with the account.

In some embodiments, inhibiting the intake of additional data can include limiting the ability to access some or all of the stored data for an account to encourage the user 108 to delete stored data, or purchase additional storage capacity. For example, if it is determined that the current allocated data size for an account associated with the user 108 is 1,001 GB, and thus exceeds the maximum usage threshold of 1,000 GB, then the index management module 150 may prevent the intake of source data 130 from the sources 112 associated with the account. Once the current allocated data size is within the maximum usage threshold, then the index management module 150 may again allow the intake of source data 130 from the sources 112 associated with the account.

In some embodiments, inhibiting the processing of data can include inhibiting the processing of source data for an account to encourage the user 108 to delete stored data, or purchase additional storage capacity. For example, if it is determined that the current allocated data size for an account associated with the user 108 is 1,001 GB, and thus exceeds the maximum usage threshold of 1,000 GB, then the index management module 150 may prevent processing (e.g., indexing, replication, and/or the like) of source data 130 received from the sources 112 associated with the account. In some embodiments, the source data 130 received from the sources 112 associated with the account may still be stored such that it is not lost, and can be processed at a later time, e.g., when the allocated data size is below a maximum data limit for the account. Once the current allocated data size is within the maximum usage threshold, then the index management module 150 may again allow the processing of source data 130 from the sources 112 associated with the account.

In some embodiments, charging a fee can include charging a fee to an account for the storage of data in excess of the maximum storage limit. For example, if it is determined that the current allocated data size for an account associated with the user 108 is 1,001 GB, and thus exceeds the maximum usage threshold of 1,000 GB by 1 GB and a fee of $100 per day is assessed for every 1 GB in excess of the purchased storage capacity, then the index management module 150 may automatically charge $100 to the account each day that the allocated data size for an account associated with the user 108 is 1,001 GB.

In some embodiments, increasing available storage can include increasing a data limit for the account to cover the excess data storage. For example, if it is determined that the current allocated data size for an account associated with the user 108 is 1,001 GB, and thus exceeds the maximum usage threshold of 1,000 GB by 1 GB, and subscriptions for data capacity are available in 10 GB increments, then the index management module 150 may automatically change to the next level subscription having a storage limit of 1,010 GB, and charge a corresponding fee to the account. Such an increase may be maintained until the user 108 changes the storage limit for the account. Thus, the account may be automatically subscribed to a storage limit that is large enough to meet the storage needs for the account.

Figure 8:
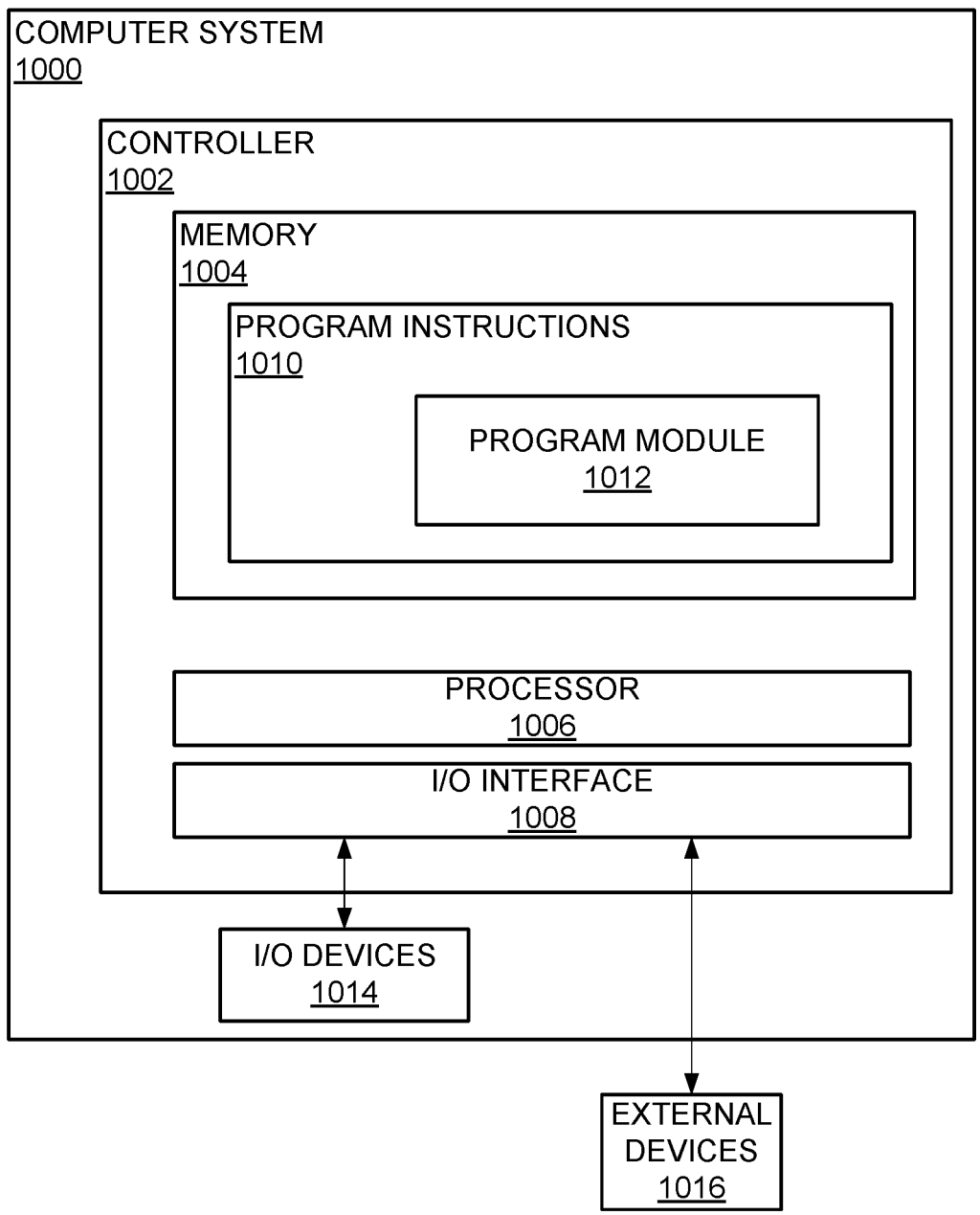
FIG. 8 is a diagram that illustrates an example computer system in accordance with the disclosed embodiments.

FIG. 8 is a diagram that illustrates an example computer system 1000 in accordance with the disclosed embodiments. In some embodiments, the computer system 1000 includes a controller 1002 for controlling the operational aspects of the computer system 1000. In some embodiments, the controller 1002 includes a memory 1004, a processor 1006, and an input/output (I/O) interface 1008. The memory 1004 may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), and/or the like. The memory 1004 may include a non-transitory computer-readable storage medium having program instructions 1010 stored thereon that are executable by a computer processor (e.g., the processor 1006) to cause the functional operations (e.g., the methods, routines, or processes) described herein. The program instructions 1010 may include program modules 1012 (e.g., including program instructions) that are executable by the processor 1006 to provide some or all of the functionality described herein, including that described with regard to the entities described (e.g., the data sources 112, the forwarders 114, the indexers 116, the index data stores 118, the search heads 120, and/or the client devices 104), and/or the methods described herein (e.g., methods 600, 700 and so forth). The program instructions 1010 may include, for example, the index management module 150.

The processor 1006 may be any suitable processor capable of executing/performing program instructions. The processor 1006 may include a central processing unit (CPU) that carries out program instructions (e.g., program instructions of the program module(s) 1012) to perform arithmetical, logical, and input/output operations described herein, including those described with regard to the data sources 112, the forwarders 114, the indexers 116, the index data stores 118, the search heads 120, the client devices 104, and/or other entities described. The processor 1006 may include one or more processors.

The I/O interface 1008 may provide an interface for communication with one or more I/O devices 1014, such as a mouse/keyboard/touchscreen, a graphical user interface (GUI) (e.g., a display), and/or the like. A display may include a suitable electronic display that can display GUIs and/or the like. Devices may be connected to the I/O interface 1008 via a wired or wireless connection. The I/O interface 1008 may provide an interface for communication with one or more external devices 1016, such as various components and entities of the environment 100, including the network 106.

Accordingly, provided in some embodiments are systems and methods for managing storage of machine data, including tracking the path of source data as it travels through a data processing system, determining an allocated data size that is the same or similar to the size of the corresponding raw data, presenting information about data storage usage, and taking actions in response to determining that one or more data store thresholds have been exceeded. The following describes an example data system that may employ the above described embodiments.

1.1 Overview of Example Performance Data System

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, California, to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that can include different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 9:
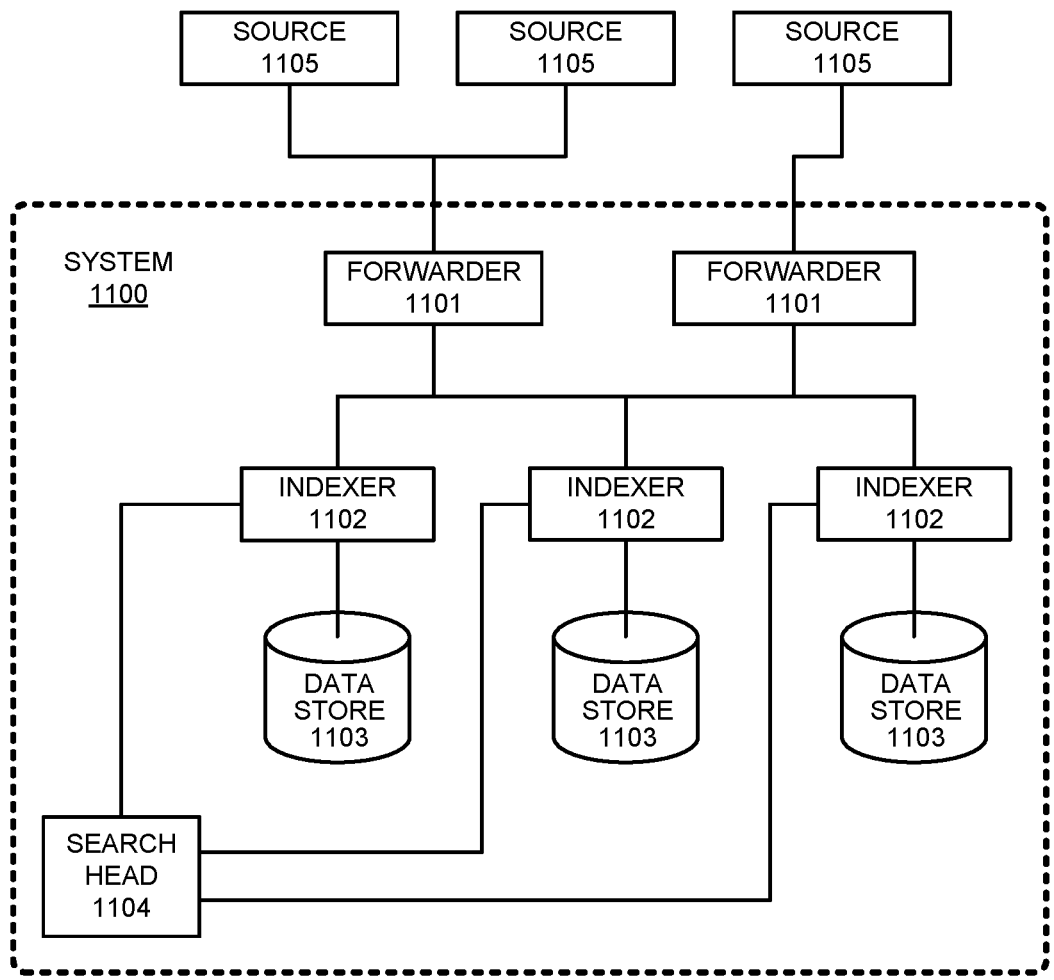
FIG. 9 presents a block diagram of an example event-processing system in accordance with the disclosed embodiments.

FIG. 9 presents a block diagram of an exemplary event-processing system 1100, similar to the SPLUNK® ENTERPRISE system. System 1100 includes one or more forwarders 1101 that collect data obtained from a variety of different data sources 1105, and one or more indexers 1102 that store, process, and/or perform operations on this data, wherein each indexer operates on data contained in a specific data store 1103. These forwarders and indexers can comprise separate computer systems in a data center, or may alternatively comprise separate processes executing on various computer systems in a data center.

During operation, the forwarders 1101 identify which indexers 1102 will receive the collected data and then forward the data to the identified indexers. Forwarders 1101 can also perform operations to strip out extraneous data and detect timestamps in the data. The forwarders 1101 next determine which indexers 1102 will receive each data item and then forward the data items to the determined indexers 1102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 1100 and the processes described below with respect to FIGS. 9-13 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAIL, 2010, each of which is hereby incorporated herein by reference in its entirety for all purposes.

1.3 Data Ingestion

Figure 10:
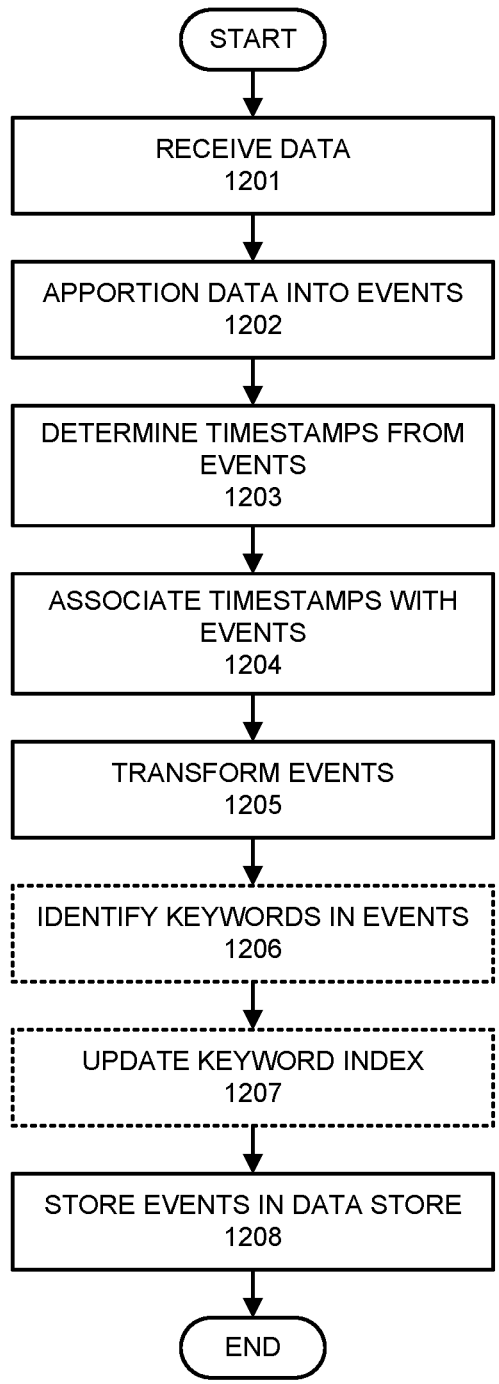
FIG. 10 presents a flowchart illustrating an example of how indexers process, index, and store data received from forwarders in accordance with the disclosed embodiments.

FIG. 10 presents a flowchart illustrating how an indexer processes, indexes, and stores data received from forwarders in accordance with the disclosed embodiments. At block 1201, the indexer receives the data from the forwarder. Next, at block 1202, the indexer apportions the data into events. Note that the data can include lines of text that are separated by carriage returns or line breaks, and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces, or line breaks. In some cases, a user can fine-tune or configure the rules that the indexers use to determine event boundaries in order to adapt the rules to the user's specific requirements.

Next, the indexer determines a timestamp for each event at block 1203. As mentioned above, these timestamps can be determined by extracting the time directly from the data in the event, or by interpolating the time based on timestamps from temporally proximate events. In some cases, a timestamp can be determined based on the time the data was received or generated. The indexer subsequently associates the determined timestamp with each event at block 1204, for example, by storing the timestamp as metadata for each event.

Then, the system can apply transformations to data to be included in events at block 1205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in events in block 1206. Then, at block 1207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or a colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 1208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 1102 is responsible for storing and searching a subset of the events contained in a corresponding data store 1103. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812 filed on Apr. 30 2014, and in U.S. patent application Ser. No. 14/266,817 also filed on Apr. 30, 2014, which are hereby incorporated by reference.

1.4 Query Processing

Figure 11:
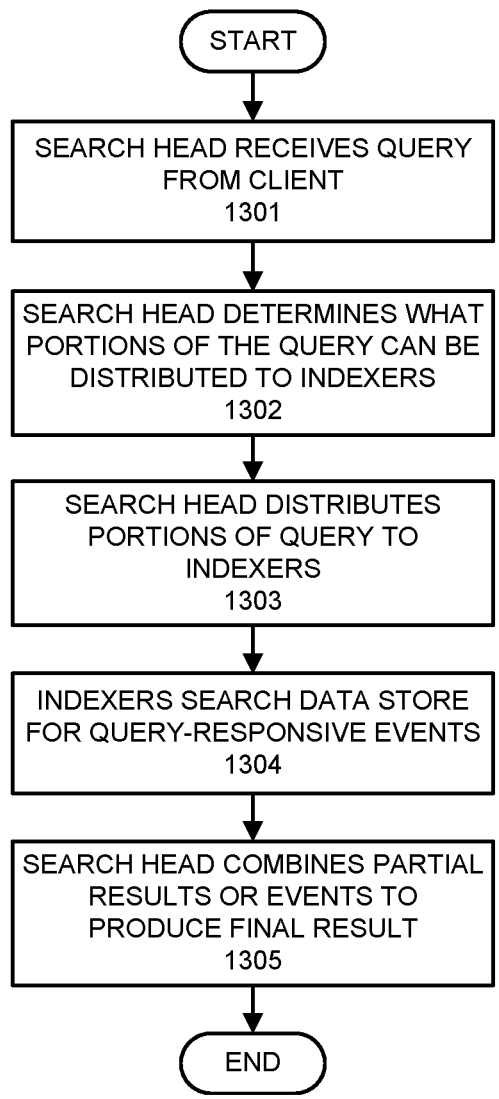
FIG. 11 presents a flowchart illustrating an example of how a search head and indexers perform a search query in accordance with the disclosed embodiments.

FIG. 11 presents a flowchart illustrating how a search head and indexers perform a search query in accordance with the disclosed embodiments. At the start of this process, a search head receives a search query from a client at block 1301. Next, at block 1302, the search head analyzes the search query to determine what portions can be delegated to indexers and what portions need to be executed locally by the search head. At block 1303, the search head distributes the determined portions of the query to the indexers. Note that commands that operate on single events can be trivially delegated to the indexers, while commands that involve events from multiple indexers are harder to delegate.

Then, at block 1304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 1304 may involve using the late-binding scheme to extract values for specified fields from events at the time the query is processed. Next, the indexers can either send the relevant events back to the search head, or use the events to calculate a partial result, and send the partial result back to the search head.

Finally, at block 1305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by the system 1100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these settings to query the indexers to obtain a superset of the eventual results. Then, during a filtering stage, the search head can perform field-extraction operations on the superset to produce a reduced set of search results.

1.5 Field Extraction

Figure 12:
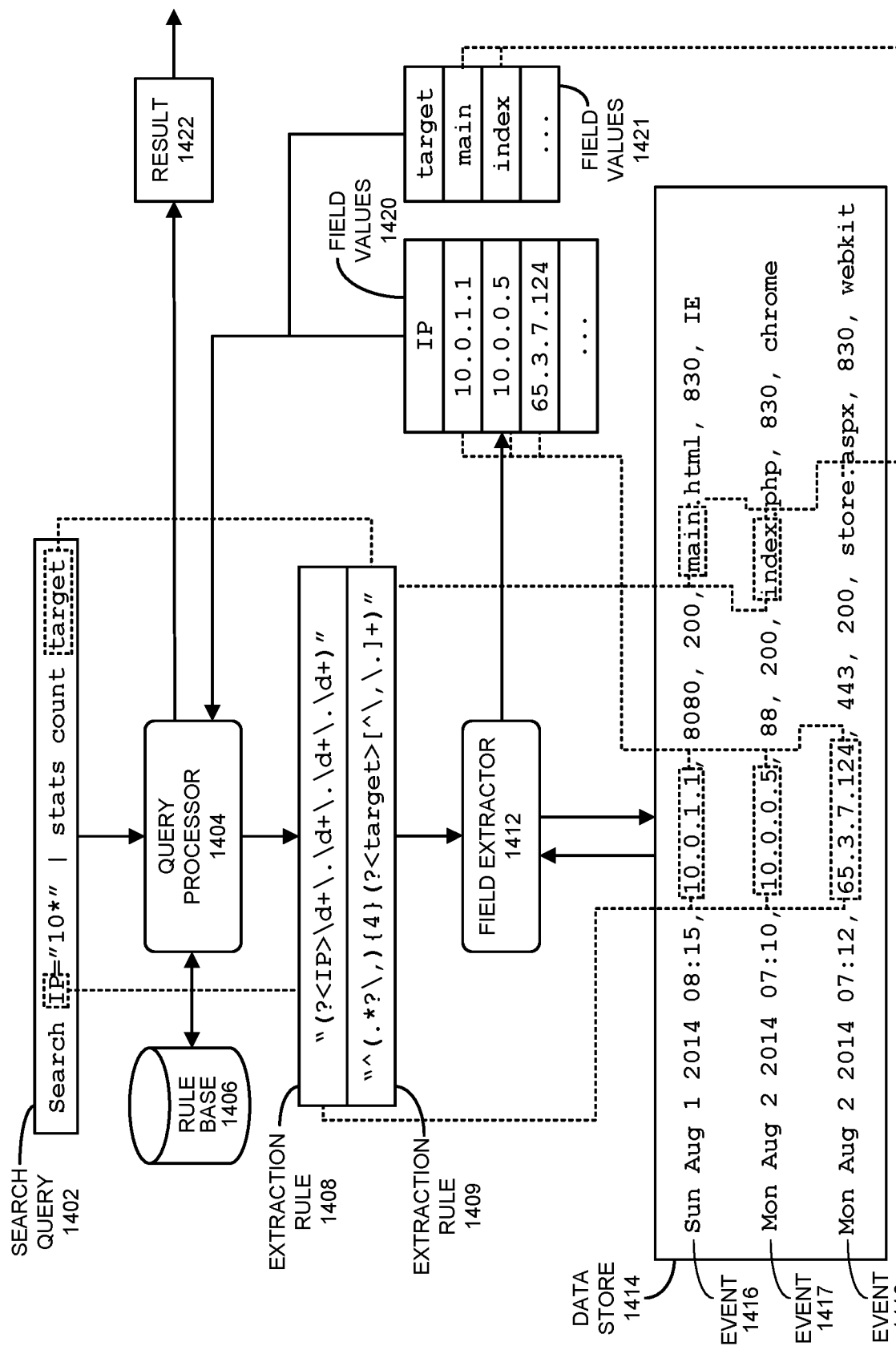
FIG. 12 presents a block diagram of an example system for processing search requests that uses extraction rules for field values in accordance with the disclosed embodiments.

FIG. 12 presents a block diagram illustrating how fields can be extracted during query processing in accordance with the disclosed embodiments. At the start of this process, a search query 1402 is received at a query processor 1404. Query processor 1404 includes various mechanisms for processing a query, wherein these mechanisms can reside in a search head 1104 and/or an indexer 1102. Note that the exemplary search query 1402 illustrated in FIG. 12 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1402 can also be expressed in other query languages, such as the Structured Query Language (SQL) or any suitable query language.

Upon receiving search query 1402, query processor 1404 sees that search query 1402 includes two fields "IP" and "target." Query processor 1404 also determines that the values for the "IP" and "target" fields have not already been extracted from events in data store 1414, and consequently determines that query processor 1404 needs to use extraction rules to extract values for the fields. Hence, query processor 1404 performs a lookup for the extraction rules in a rule base 1406, wherein the rule base 1406 maps field names to corresponding extraction rules and obtains extraction rules 1408-1409, wherein extraction rule 1408 specifies how to extract a value for the "IP" field from an event, and extraction rule 1409 specifies how to extract a value for the "target" field from an event. As is illustrated in FIG. 12, extraction rules 1408-1409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or a value retrieved by the extraction rule. For example, a transformation rule may truncate a character string, or convert the character string into a different data format. In some cases, the query itself can specify one or more extraction rules.

Next, query processor 1404 sends extraction rules 1408-1409 to a field extractor 1412, which applies extraction rules 1408-1409 to events 1416-1418 in a data store 1414. Note that data store 1414 can include one or more data stores, and extraction rules 1408-1409 can be applied to large numbers of events in data store 1414, and are not meant to be limited to the three events 1416-1418 illustrated in FIG. 12. Moreover, the query processor 1404 can instruct field extractor 1412 to apply the extraction rules to all of the events in a data store 1414, or to a subset of the events that have been filtered based on some criteria.

Next, field extractor 1412 applies extraction rule 1408 for the first command "Search IP="10*"" to events in data store 1414 including events 1416-1418. Extraction rule 1408 is used to extract values for the IP address field from events in data store 1414 by looking for a pattern of one or more digits, followed by a period, followed again by one or more digits, followed by another period, followed again by one or more digits, followed by another period, and followed again by one or more digits. Next, field extractor 1412 returns field values 1420 to query processor 1404, which uses the criterion IP="10*" to look for IP addresses that start with "10". Note that events 1416 and 1417 match this criterion, but event 1418 does not, so the result set for the first command is events 1416-1417.

Query processor 1404 then sends events 1416-1417 to the next command "stats count target." To process this command, query processor 1404 causes field extractor 1412 to apply extraction rule 1409 to events 1416-1417. Extraction rule 1409 is used to extract values for the target field for events 1416-1417 by skipping the first four commas in events 1416-1417, and then extracting all of the following characters until a comma or period is reached. Next, field extractor 1412 returns field values 1421 to query processor 1404, which executes the command "stats count target" to count the number of unique values contained in the target fields, which in this example produces the value "2" that is returned as a final result 1422 for the query.

Note that the query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or a chart, generated from the values.

1.6 Exemplary Search Screen

FIG. 14A illustrates an exemplary search screen 1600 in accordance with the disclosed embodiments. Search screen 1600 includes a search bar 1602 that accepts user input in the form of a search string. It also includes a time range picker 1612 that enables the user to specify a time range for the search. For "historical searches," the user can select a specific time range, or alternatively a relative time range, such as "today," "yesterday," or "last week." For "real-time searches," the user can select the size of a preceding time window to search for real-time events. Search screen 1600 also initially displays a "data summary" dialog as is illustrated in FIG. 14B that enables the user to select different sources for the event data, for example, by selecting specific hosts and log files.

After the search is executed, the search screen 1600 can display the results through search results tabs 1604, wherein search results tabs 1604 include: an "events tab" that displays various information about events returned by the search; a "statistics tab" that displays statistics about the search results; and a "visualization tab" that displays various visualizations of the search results. The events tab illustrated in FIG. 14A displays a timeline graph 1605 that graphically illustrates the number of events that occurred in one-hour intervals over the selected time range. It also displays an events list 1608 that enables a user to view the raw data in each of the returned events. It additionally displays a fields sidebar 1606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 13 illustrates how a search query 1501 received from a client at search head 1104 can split into two phases, including: (1) a "map phase" comprising subtasks 1502 (e.g., data retrieval or simple filtering) that may be performed in parallel and are "mapped" to indexers 1102 for execution, and (2) a "reduce phase" comprising a merging operation 1503 to be executed by the search head when the results are ultimately collected from the indexers.

During operation, upon receiving search query 1501, search head 1104 modifies search query 1501 by substituting "stats" with "prestats" to produce search query 1502, and then distributes search query 1502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 9, or may alternatively distribute a modified version (e.g., a more restricted version) of the search query to the search peers. In this example, the indexers are responsible for producing the results and sending them to the search head. After the indexers return the results to the search head, the search head performs the merging operations 1503 on the results. Note that by executing the computation in this way, the system effectively distributes the computational operations while minimizing data transfers.

1.7.2 Keyword Index

As described above with reference to the flowcharts in FIGS. 10 and 11, the event-processing system 1100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of the system 1100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014, which is hereby incorporated by reference.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether the generation of updated reports can be accelerated by creating intermediate summaries. (This is possible if results from preceding time periods can be computed separately and combined to generate an updated report. In some cases, it is not possible to combine such incremental results, for example, where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that matches the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011, which are hereby incorporated by reference.

1.8 Security Features

The SPLUNK® ENTERPRISE platform provides various schemas, dashboards, and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (SIEM) systems that lack the infrastructure to effectively store and analyze large volumes of security-related event data. Traditional SIEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volumes, uniform resource locator strings, and source addresses. The process of detecting security threats for network-related information is further described in U.S. patent application Ser. Nos. 13/956,252, and 13/956,262, which are hereby incorporated by reference. Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 15A:
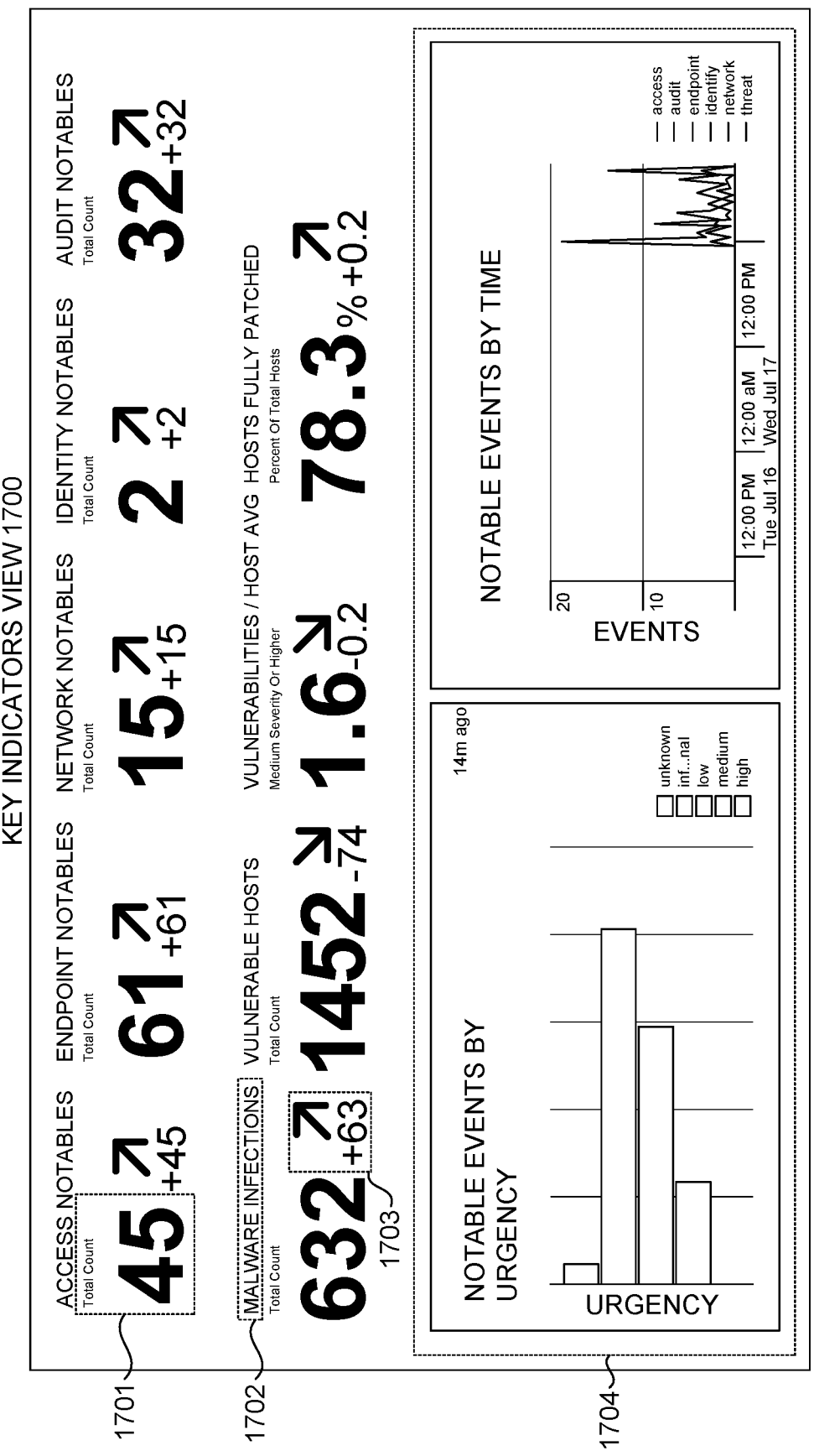
FIG. 15A illustrates an example key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 15A illustrates an exemplary key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338 filed Jul. 31, 2013, which is hereby incorporated by reference.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 15B illustrates an exemplary incident review dashboard 1710 that includes a set of incident attribute fields 1711 that, for example, enables a user to specify a time range field 1712 for the displayed events. It also includes a timeline 1713 that graphically illustrates the number of incidents that occurred in one-hour time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/2.1.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example, by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, California. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed Jan. 29, 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 15C:
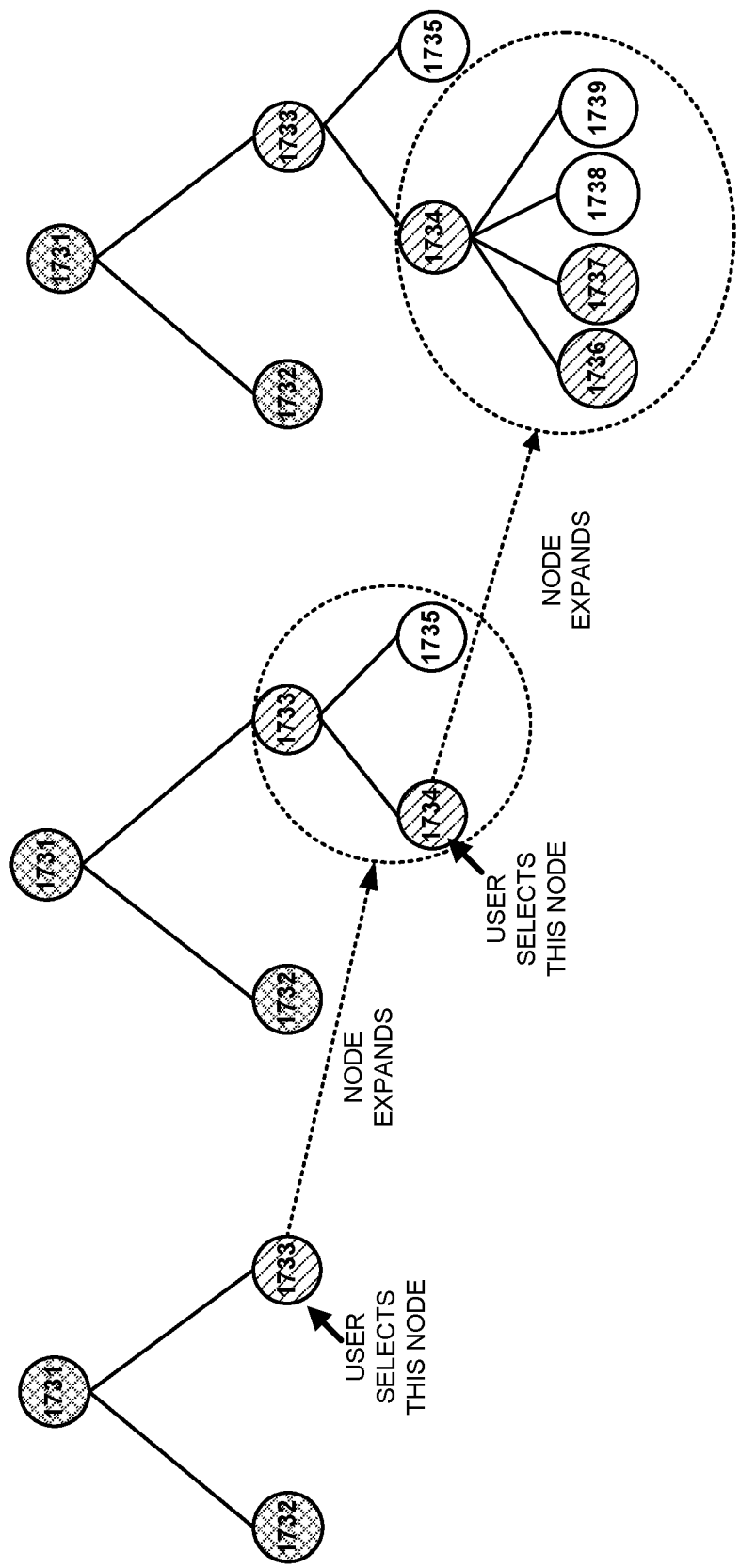
FIG. 15C illustrates an example proactive monitoring tree in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 15C, wherein nodes 1733 and 1734 are selectively expanded. Note that nodes 1731-1739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490 filed on Apr. 15, 2014, which is hereby incorporated by reference.

Figure 15D:
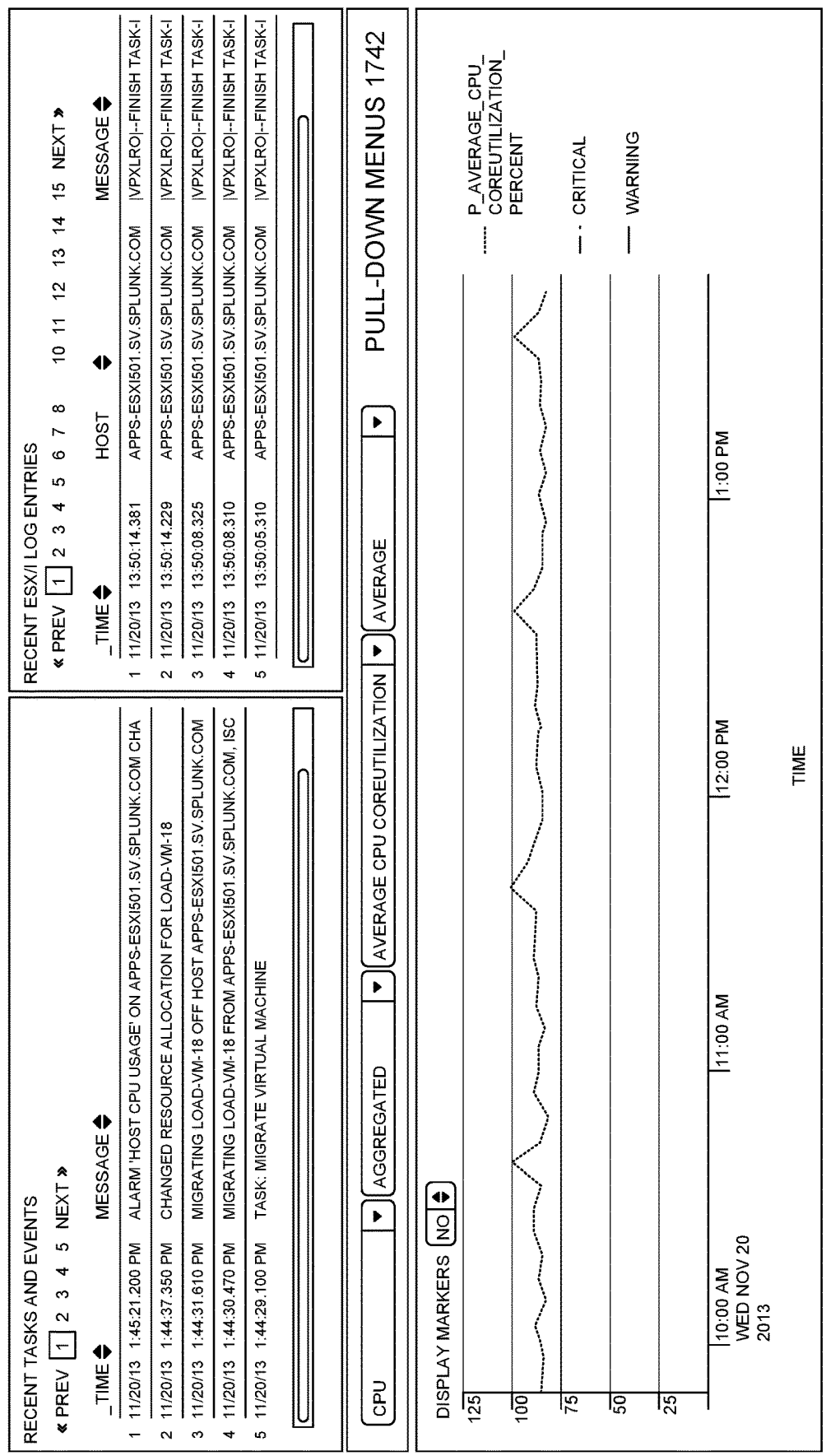
FIG. 15D illustrates an example screen displaying both log data and performance data in accordance with the disclosed embodiments.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 15D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316 filed on Jan. 29, 2014, which is hereby incorporated by reference.

Further modifications and embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

It will be appreciated that the methods described are example embodiments of methods that may be employed in accordance with the techniques described herein. The methods may be modified to facilitate variations of their implementation and use. The order of the methods and the operations provided therein may be changed, and various elements may be added, reordered, combined, omitted, modified, etc. Portions of the methods may be implemented in software, hardware, or a combination thereof. Some or all of the portions of the methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method comprising:
receiving source data associated with an account, the source data having a raw data size;
processing the source data into searchable events and storing the searchable events in a plurality of searchable indices, the searchable events having a storage footprint that is different than the raw data size;
monitoring the plurality of searchable indices to track the raw data size of the source data corresponding to the searchable events maintained in the plurality of searchable indices and assigning the raw data size of the source data corresponding to the storage footprint of the searchable events in the plurality of searchable indices to an allocated storage consumption of the account; and based on the allocated storage consumption, instead of the storage footprint of the searchable events, for the account exceeding a storage consumption threshold, executing one or more actions comprising at least one of: deleting at least some of the searchable events from the plurality of searchable indices, inhibiting access to the plurality of searchable indices, or inhibiting processing of additional source data for the account, charge an overage fee to the account, or increase the storage consumption threshold for the account.

2. The computer-implemented method of claim 1, further comprising causing a graphical index management user interface configured to manage the plurality of searchable indices to present a representation of the allocated storage consumption of the account and corresponding portions of the allocated storage consumption consumed by the plurality of searchable indices.

3. The computer-implemented method of claim 1, further comprising, in response to receiving the additional source data associated with the account, increasing the allocated storage consumption of the account by a corresponding raw data size of the additional source data, independent of a corresponding storage footprint of the additional source data in the plurality of searchable indices.

4. The computer-implemented method of claim 1, further comprising, in response to removing stored data associated with the account from the plurality of searchable indices, decreasing the allocated storage consumption of the account by a corresponding raw data size of tracked source data that corresponds to the stored data removed from the plurality of searchable indices.

5. The computer-implemented method of claim 1, further comprising indexing the source data, wherein the indexing comprises the processing and the storing.

6. The computer-implemented method of claim 1, wherein the processing of the source data comprises metadata addition, compression of the source data, or replication of the source data.

7. The computer-implemented method of claim 1, further comprising performing further processing on the searchable events, thereby changing the storage footprint of the searchable events in the plurality of searchable indices, without changing the allocated storage consumption of the account.

8. One or more non-transitory computer storage media storing computer-useable instructions that, when used by one or more computing devices, cause the one or more computing devices to perform operations comprising:
receiving source data associated with an account, the source data having a raw data size;
processing the source data into searchable events and storing the searchable events in a plurality of searchable indices, the searchable events having a storage footprint that is different than the raw data size;
monitoring the plurality of searchable indices to track the raw data size of the source data corresponding to the searchable events maintained in the plurality of searchable indices and assigning the raw data size of the source data corresponding to the storage footprint of the searchable events in the plurality of searchable indices to an allocated storage consumption of the account; and
based on the allocated storage consumption, instead of the storage footprint of the searchable events, for the account exceeding a storage consumption threshold, executing one or more actions comprising at least one of: deleting at least some of the searchable events from the plurality of searchable indices, inhibiting access to the plurality of searchable indices, or inhibiting processing of additional source data for the account, charge an overage fee to the account, or increase the storage consumption threshold for the account.

9. The one or more non-transitory computer storage media of claim 8, the operations further comprising adjusting the allocated storage consumption of the account in response to receiving the additional source data associated with the account or removing stored data associated with the account from the plurality of searchable indices.

10. The one or more non-transitory computer storage media of claim 8, the operations further comprising, in response to receiving the additional source data associated with the account, increasing the allocated storage consumption of the account by a corresponding raw data size of the additional source data, independent of a corresponding storage footprint of the additional source data in the plurality of searchable indices.

11. The one or more non-transitory computer storage media of claim 8, the operations further comprising, in response to removing stored data associated with the account from the plurality of searchable indices, decreasing the allocated storage consumption of the account by a corresponding raw data size of tracked source data that corresponds to the stored data removed from the plurality of searchable indices.

12. The one or more non-transitory computer storage media of claim 8, the operations further comprising indexing the source data, wherein the indexing comprises the processing and the storing.

13. The one or more non-transitory computer storage media of claim 8, wherein the processing of the source data comprises metadata addition, compression of the source data, or replication of the source data.

14. The non-transitory one or more computer storage media of claim 8, the operations further comprising performing further processing on the searchable events, thereby changing the storage footprint of the searchable events in the plurality of searchable indices, without changing the allocated storage consumption of the account.

15. A computer system comprising:
one or more processors and one or more computer-readable storage media containing instructions which, when executed by the one or more processors, cause the one or more processors to perform operations comprising:
receiving source data associated with an account, the source data having a raw data size;
processing the source data into searchable events and storing the searchable events in a plurality of searchable indices, the searchable events having a storage footprint that is different than the raw data size;
monitoring the plurality of searchable indices to track the raw data size of the source data corresponding to the searchable events maintained in the plurality of searchable indices and assigning the raw data size of the source data corresponding to the storage footprint of the searchable events in the plurality of searchable indices to an allocated storage consumption of the account; and
based on the allocated storage consumption, instead of the storage footprint of the searchable events, for the account exceeding a storage consumption threshold, executing one or more actions comprising at least one of: deleting at least some of the searchable events from the plurality of searchable indices, inhibiting access to the plurality of searchable indices, or inhibiting processing of additional source data for the account, charge an overage fee to the account, or increase the storage consumption threshold for the account.

16. The computer system of claim 15, the operations further comprising, in response to receiving the additional source data associated with the account, increasing the allocated storage consumption of the account by a corresponding raw data size of the additional source data, independent of a corresponding storage footprint of the additional source data in the plurality of searchable indices.

17. The computer system of claim 15, the operations further comprising, in response to removing stored data associated with the account from the plurality of searchable indices, decreasing the allocated storage consumption of the account by a corresponding raw data size of tracked source data that corresponds to the stored data removed from the plurality of searchable indices.

18. The computer system of claim 15, the operations further comprising indexing the source data, wherein the indexing comprises the processing and the storing.

19. The computer system of claim 15, wherein the processing of the source data comprises metadata addition, compression of the source data, or replication of the source data.

20. The computer system of claim 15, the operations further comprising performing further processing on the searchable events, thereby changing the storage footprint of the searchable events in the plurality of searchable indices, without changing the allocated storage consumption of the account.

* * * * *